(12) United States Patent
Koike

(10) Patent No.: US 7,561,180 B2
(45) Date of Patent: Jul. 14, 2009

(54) MOVABLE BODY SAFETY SYSTEM AND MOVABLE BODY OPERATION SUPPORT METHOD

(75) Inventor: Shin Koike, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 866 days.

(21) Appl. No.: 10/347,281

(22) Filed: Jan. 21, 2003

(65) Prior Publication Data

US 2003/0146827 A1 Aug. 7, 2003

(30) Foreign Application Priority Data

Feb. 7, 2002 (JP) ............................. 2002-031413

(51) Int. Cl.
*H04N 7/18* (2006.01)
(52) U.S. Cl. ..................... 348/148; 701/301; 340/903
(58) Field of Classification Search ................. 348/148; 340/903; 701/301
See application file for complete search history.

(56) References Cited

U.S. PATENT DOCUMENTS

| | | | |
|---|---|---|---|
| 2,197,487 A | | 4/1940 | Smalley |
| 3,049,962 A | | 8/1962 | Denecke |
| 3,081,415 A | | 3/1963 | Casselman et al. |
| 4,858,080 A | * | 8/1989 | Oikawa ..................... 362/466 |
| 4,899,296 A | * | 2/1990 | Khattak ..................... 702/40 |
| 5,660,454 A | * | 8/1997 | Mori et al. ................. 362/466 |
| 6,067,031 A | * | 5/2000 | Janky et al. ................ 340/903 |
| 6,144,158 A | | 11/2000 | Beam |
| 6,150,930 A | * | 11/2000 | Cooper ..................... 340/435 |
| 6,285,778 B1 | * | 9/2001 | Nakajima et al. ........... 382/104 |
| 6,538,622 B1 | * | 3/2003 | Kojima et al. .............. 345/7 |
| 6,786,610 B2 | | 9/2004 | Faris |
| 2003/0128106 A1 | * | 7/2003 | Ross ........................ 340/435 |

FOREIGN PATENT DOCUMENTS

| | | |
|---|---|---|
| JP | A03-144799 | 6/1991 |
| JP | U-03-097799 | 10/1991 |
| JP | A-05-065707 | 3/1993 |

(Continued)

OTHER PUBLICATIONS

"Orientation", Roget's II: The new thesaurus. 1995, Houghton Mifflin Company, Third edition.*

*Primary Examiner*—Andy S Rao
*Assistant Examiner*—Jeremaiah C Huber
(74) *Attorney, Agent, or Firm*—Oliff & Berridge, PLC

(57) ABSTRACT

A beam radiator for radiating a visible light beam on a road surface with a pattern determined according to a predetermined rule in order to inform others of the existence of a subject vehicle. In addition, an imaging device having an effective imaging region for generating an image of an entire subject pattern reflected on the road surface by the visible light beam from the beam radiator. The subject pattern formed by the visible light beam from the subject vehicle and the other pattern formed by the visible light or the invisible light beam from the other vehicle or an infrastructure are extracted by processing the image generated by the imaging device. Then, on the basis of the relation between the subject pattern and the other pattern, it is determined whether the subject vehicle is in a state where attention is required during running.

14 Claims, 17 Drawing Sheets

FOREIGN PATENT DOCUMENTS

| | | |
|---|---|---|
| JP | A 5-238307 | 9/1993 |
| JP | A 6-270752 | 9/1994 |
| JP | A-08-101092 | 4/1996 |
| JP | A-10-079100 | 3/1998 |
| JP | A-11-053693 | 2/1999 |
| JP | 2000180378 A * | 6/2000 |
| JP | A 2000-161941 | 6/2000 |
| JP | A-2001-222800 | 8/2001 |

* cited by examiner

VISIBLE LIGHT
PATTERN

VISIBLE LIGHT
PATTERN

VISIBLE LIGHT PATTERN

MOVABLE BODY SAFETY SYSTEM AND MOVABLE BODY OPERATION SUPPORT METHOD

INCORPORATION BY REFERENCE

The disclosure of Japanese Patent Application(s) No. 2002-31413 filed on Feb. 7, 2002 including the specification, drawings and abstract is incorporated herein by reference in its entirety.

BACKGROUND OF INVENTION

1. Field of Invention

The invention relates to a movable body safety system. More particularly, the invention relates to a movable body safety system which is suitable for determining whether a subject movable body is in a state where attention is required during moving, based on road surface projection information formed on a road surface by a light beam radiated by a movable body such as a vehicle.

2. Description of Related Art

A vehicle safety system which radiates a light beam visible to others on a road surface is generally known. An example of such a system is disclosed in Japanese Patent Laid-Open Publication No. 5-238307. When a vehicle radiates a light beam visible to others on a road surface during running, they can visually recognize an indication formed on the road surface by the light beam radiated by the vehicle. Thus, a person who sees the indication on the road surface formed by the light beam can recognize that the vehicle exists in the vicinity even if the person cannot see the vehicle itself. Therefore, this system can inform others of the existence of the vehicle, which can improve safety concerning vehicle running.

According to the aforementioned system, a person can recognize the existence of a vehicle by seeing an indication formed on a road surface by a light beam radiated by the vehicle, even if the person cannot see the vehicle itself. Thus, it is possible for the person to recognize that some kind of attention is required. However, particularly a driver of a vehicle, which is a movable body, has difficulty in determining a relation with another vehicle even when the driver sees the indication on the road surface formed by the light beam radiated by the other vehicle.

SUMMARY OF THE INVENTION

In view of this, it is an object of the invention to provide a movable body safety system which can determine a state where attention is required in the subject movable body during moving, based on road surface projection information formed on a road surface by a light beam radiated by another movable body.

In order to achieve the above object, a movable body safety system according to a first aspect of the invention includes a road surface projection information obtaining portion that obtains road surface projection information formed by a light beam which a movable body radiates on a road surface in order to inform others of the existence of the movable body. The safety system also includes an attention required state determining portion that determines a state where attention is required in a subject movable body, under a condition where the road surface projection information obtaining portion obtains the first road surface projection information formed by another movable body, based on a relation between the road surface projection information formed by the other movable body and course information in the subject movable body.

The movable body safety system according to the first aspect of the invention obtains road surface projection information formed by a light beam which a movable body radiates on a road surface in order to inform others of the existence of the movable body. Since the light beam radiated by the movable body informs others of the existence of the movable body, the road surface projection information formed by the light beam includes course information on the movable body during moving. In addition, the danger posed to the subject movable body varies depending on the relation between the road surface projection information formed by the other movable body and the course information on the subject movable body. Accordingly, it is possible to determine the state where attention is required in the subject movable body during moving, based on the first road surface projection information formed on the road surface by the light beam radiated by the other movable body.

Note that, in the first aspect of the invention, "course information" signifies information on, for example, a direction in which a movable body is moving and a position of the movable body, or a direction in which inertial force is applied to the movable body and the magnitude of the inertial force.

If the course information on the subject movable body is not extracted based on the course information from which the course information on the other movable body is extracted, the both pieces of the course information are on different dimensions. Therefore, it becomes difficult to ensure the accuracy in determining the state where attention is required in the subject movable body during moving.

Therefore, the movable body safety system according to the first aspect of the invention may include a beam radiating portion that radiates light beam with a predetermined pattern indicated second road surface projection information on a road surface in order to inform others of the existence of the subject movable body. Also, the safety system may be configured such that: the aforementioned road surface projection information obtaining portion obtains an obtainable region including at least the second road surface projection information formed on the road surface by the light beam radiated by the aforementioned beam radiating portion of the subject movable body; and under a condition where the aforementioned road surface projection information obtaining portion obtains the first road surface projection information and the second road surface projection information, the aforementioned attention required state determining portion determines the state where attention is required in the subject movable body, based on the relation between the course information on the other movable body included in the first road surface projection information and the course information on the subject movable body included in the second road surface projection information. In this configuration, since the course information on the subject movable body and the course information on the other movable body are compared on the same dimension, it becomes possible to improve the accuracy in determining the state where attention is required in the subject movable body during moving.

In this case, in the movable body safety system according to the first aspect of the invention, the aforementioned road surface projection information obtaining portion may obtain the aforementioned at least of first and second road surface projection information using an imaging device for generating an image of a predetermined region of the road surface.

Also, it is possible to detect the course information on the subject movable body based on a motion parameter of the subject movable body (for example, a parameter on an operation performed by the driver, such as a steering angle and an accelerator operation quantity, and the motion state of the movable body such as an actual wheel steering angle, vehicle speed, acceleration, and a yaw rate.)

Therefore, the movable body safety system according to the first aspect of the invention may include a course information detecting portion that detects course information on the subject movable body based on the motion parameter of the subject movable body. In addition, the course information detecting portion may determine the state where attention is required in the subject movable body, under a condition where the road surface projection information obtaining portion obtains the first road surface projection information formed by another movable body, based on a relation between course information on the other movable body included in the first road surface projection information and course information on the subject movable body detected by the subject course information detection portion.

Note that, in the movable body safety system according to the first aspect of the invention, the first road surface projection information and the second road surface projection information may indicate a presumed movement trajectory.

Also, a movable body safety system according to a second aspect of the invention includes a road surface projection information obtaining portion that obtains road surface projection information formed on a road surface by a light beam which an infrastructure radiates in order to call attention. The safety system also includes an attention required state determining portion that determines a state where attention is required in the subject movable body, under a condition where the road surface projection information obtaining portion obtains road surface projection information formed by the infrastructure, based on a relation between the position of the road surface projection information formed by the infrastructure and course information on the subject movable body. In this configuration, the movable body safety system is effective for determining a state where attention is required in the subject movable body during moving based on the road surface projection information formed on the road surface by the light beam radiated by the infrastructure.

According to the invention, there is obtained the road surface projection information formed on the road surface by the light beam which the infrastructure radiates in order to call attention. The degree of danger posed to the subject movable body varies depending on the relation between the position of the road surface projection information on the infrastructure side and the course information on the subject movable body. Therefore, it is possible to determine the state where attention is required in the subject movable body during moving based on the road surface projection information formed on the road surface by the light beam radiated by the infrastructure.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
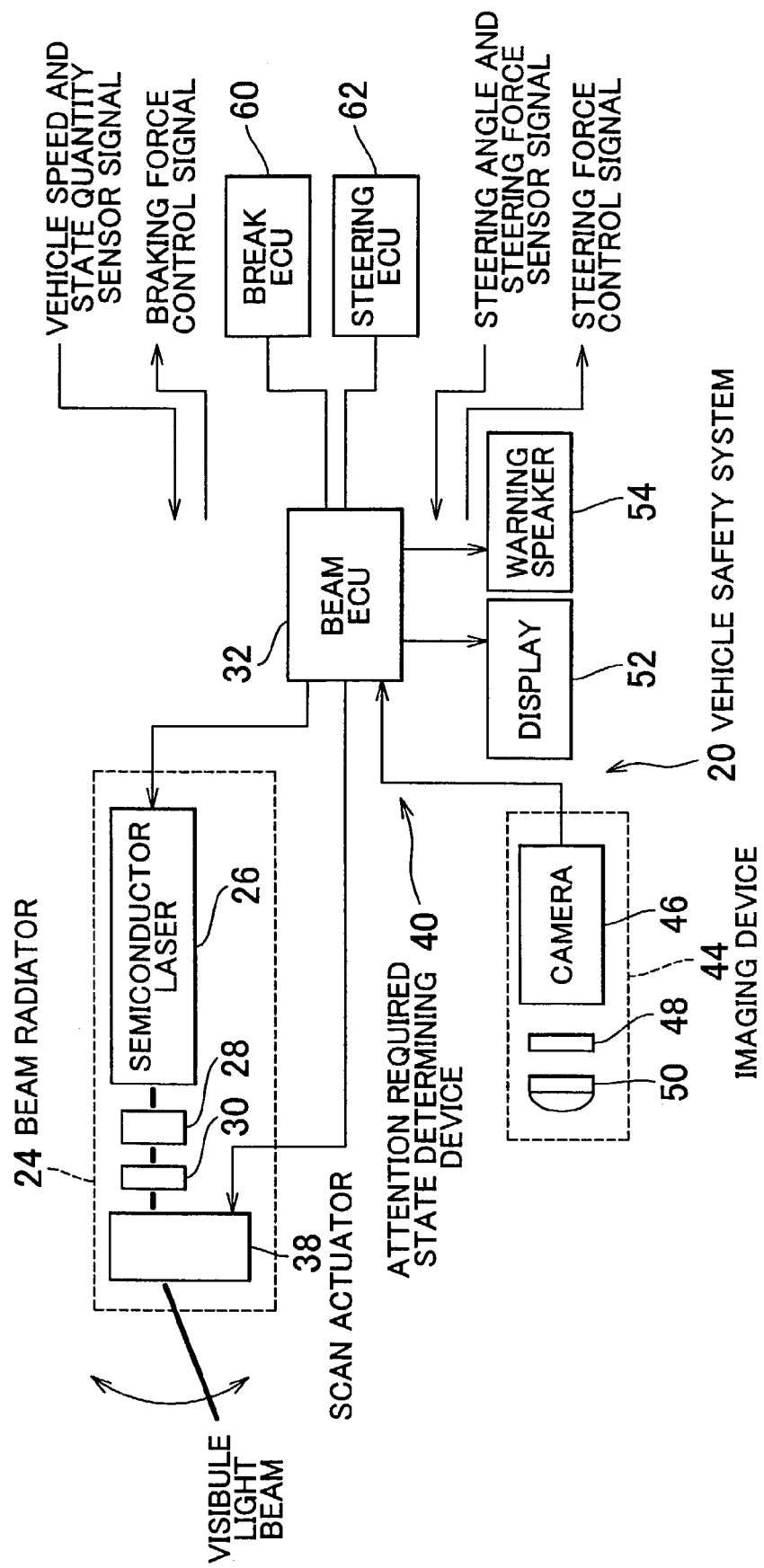
FIG. 1 is a diagram showing the configuration of a movable body safety system according to an embodiment of the invention.
Figure 2:
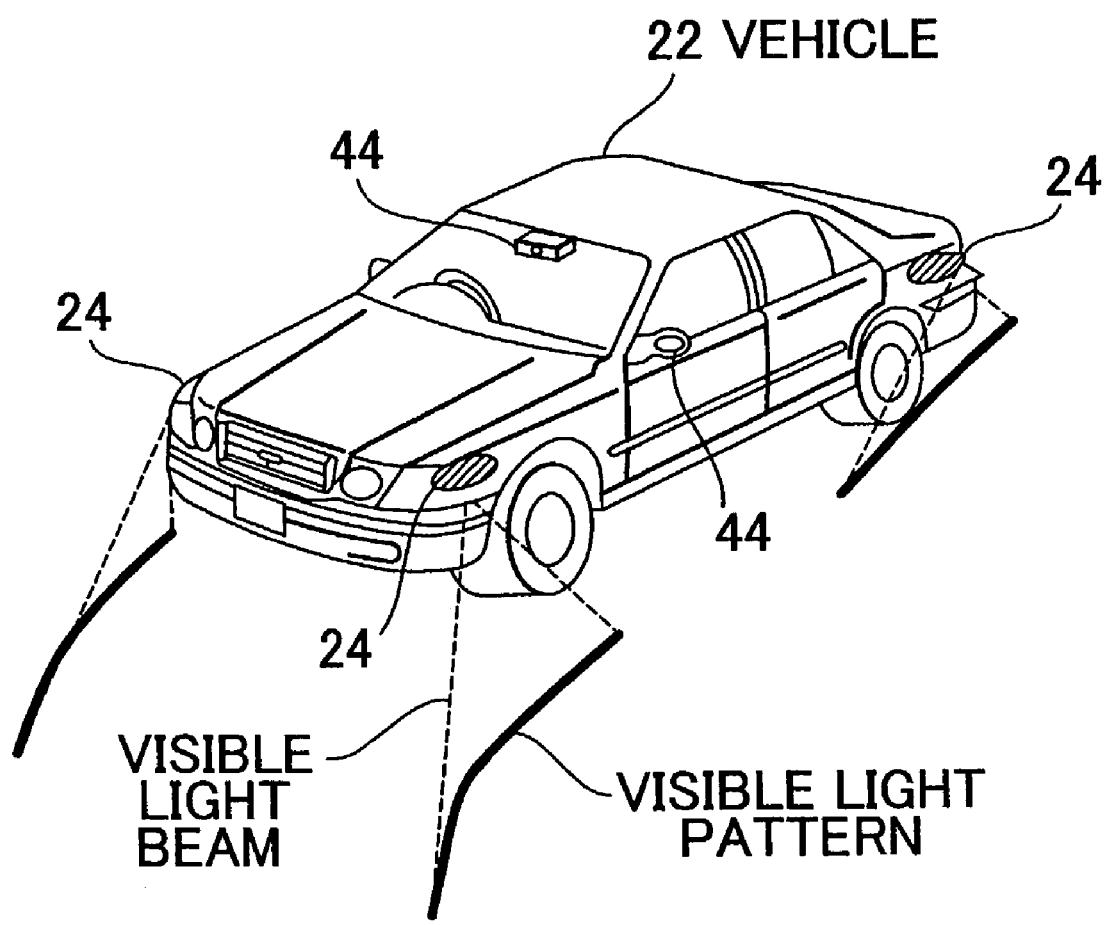
FIG. 2 is a diagram showing locations in a vehicle for installing components which constitute the movable body safety system according to the embodiment of the invention.

FIG. 1 is a diagram showing the configuration of a movable body safety system 20 according to an embodiment of the invention. FIG. 2 is a diagram showing locations in a vehicle 22 for installing components which constitute the movable body safety system 20 according to the embodiment of the invention. The movable body safety system according to the embodiment of the invention includes four beam radiators 24. As shown in FIG. 2, the beam radiators 24 are provided in each of the right and left side portions in the front portion of the vehicle body, and in each of the right and left side portions in the rear portion of the vehicle. The beam radiator 24 provided in the left front portion of the vehicle body, the beam radiator 24 provided in the right front portion of the vehicle body, the beam radiator 24 provided in the left rear portion of the vehicle, and the beam radiator 24 provided in the right rear portion of the vehicle radiate a light beam toward a road surface on the left side ahead of the vehicle, a road surface on the right side ahead of the vehicle, a road surface on the left side behind the vehicle, and on the right side behind the vehicle, respectively, according to rules (described in detail later).

Each of the beam radiators 24 includes a beam generating device 26 including a semiconductor laser, a beam forming lens 28, and a polarized light forming device 30. The beam generating device 26 generates a light beam having, for example, the wavelength of 0.55 μm in the visible light region (hereinafter, this light beam is referred to as a visible light beam.) An electronic control unit for beam (hereinafter, it is referred to as a beam ECU) 32 is connected to the beam generating device 26. The beam generating device 26 is configured such that brightness and hue of a generated visible light beam can be changed based on a command signal from the beam ECU 32. Also, the beam forming lens 28 has the function of forming the visible light beam generated by the beam generating device 26. The polarized light forming device 30 has the function of polarizing the visible light beam output from the beam forming lens 28 by reflecting a portion of an element perpendicular to a plane of incidence.

Each of the beam radiators 24 includes a scan actuator 38 including, for example, an ultrasonic polarizing device or a galvanometer mirror. The scan actuator 38 has the function of sweeping the visible light beam polarized by the polarized light forming device 30. The aforementioned beam ECU 32 is connected to each of the scan actuators 38. The beam ECU 32 drives each of the scan actuators 38 such that patterns in desired forms (hereinafter, they are referred to as visible light patterns) appear on a road surface due to the visible light beams. Each of the scan actuators 38 sweeps the visible light beam polarized by the polarized light forming device 30 according to the command from the beam ECU 32. When the beam radiators 24 radiate the visible light beams on the road surface around the vehicle, the visible light patterns are reflected on the road surface by the visible light beams so that a person can visibly recognize the patterns.

The movable body safety system 20 also includes an attention required state determining device 40. The attention required state determining device 40 includes the aforementioned four beam radiators 24 and four imaging devices 44. The imaging devices 44 are provided ahead of a rearview mirror in the vehicle compartment, in the center of a bumper in the rear portion of the vehicle, and in each of mirror stays in the centers of right and left side portions of the vehicle. The imaging device 44 in the vehicle compartment, the imaging device 44 in the rear portion of the vehicle, the imaging device 44 in the left side portion of the vehicle, and the imaging device 44 in the right side portion of the vehicle generate images of the road surface ahead of the vehicle, the road surface behind the vehicle, the road surface on the left side of the vehicle, and the road surface on the right side of the vehicle, respectively.

Each of the imaging devices 44 includes a camera 46 for generating an image of a road surface, a frequency filter 48 for allowing an element in a predetermined frequency band including the visible light region and infrared light region to pass therethrough, and a wide-angle lens 50 having a predetermined angle of divergence. The imaging devices 44 have an effective imaging region so as to generate the image of the entire visible light patterns reflected on the road surface by the visible light beams radiated by the beam radiators 24 of the subject vehicle. The imaging devices 44 can generate the images of the visible light patterns formed by the subject vehicle, visible light patterns formed by another vehicle existing in the effective imaging region, and patterns formed on the road surface by infrared light (hereinafter, they are referred to as invisible light patterns.)

The beam ECU 32 is connected to each of the imaging devices 44. The image generated by each of the imaging devices 44 is supplied to the beam ECU 32. The beam ECU 32 extracts the patterns formed by the visible light beams and the patterns formed by the invisible light beams by processing the image supplied by each of the imaging devices 44. Hereinafter, the extracted patterns are referred to as extract patterns.

As mentioned above, the beam ECU 32 drives the scan actuators 38 of the beam radiators 24 so that the visible light patterns reflected on the road surface by the visible light beams become patterns in desired forms. Therefore, it is possible to specify positions where the visible light patterns formed by the visible light beams from the subject vehicle is to exist in the images from the imaging device 44. The beam ECU 32 separates the visible light patterns formed by the subject vehicle (hereinafter, the patterns are referred to as subject patterns), and the visible light patterns or invisible light patterns formed by another vehicle or an infrastructure (hereinafter, the patterns are referred to as the other patterns) from the extract patterns. Then, as described later, it is determined whether the subject vehicle 22 is in a state where attention is required during running, based on a relation between the subject patterns and the other patterns. In addition, it is determined whether the subject vehicle 22 is in a state where avoidance running is required. Thus, the attention required state determining device 40 determines an attention required state and an avoidance required state of the subject vehicle 22 using the beam radiators 24 and the imaging devices 44.

A display 52 and a warning speaker 54 are connected to the beam ECU 32. The display 52 is provided at such a location as to allow it to be visually recognized by the driver in the vehicle compartment. The warning speaker 54 is provided in the vehicle compartment. The display 52 displays the images generated by the imaging devices 44 according to the command from the beam ECU 32. In addition, the display 52 displays an attention required location or an avoidance required location by flashing or the like when it is determined that the subject vehicle 22 is in an attention required state or an avoidance required state based on the images generated by the imaging devices 44. Also, the warning speaker 54 gives a warning by voice when it is determined that the subject vehicle 22 is in an attention required state or an avoidance required state based on the images generated by the imaging devices 44.

Also, a brake ECU 60 and a steering ECU 62 are connected to the beam ECU 32. The brake ECU 60 controls the braking force of the subject vehicle 22 using a brake actuator. The steering ECU 62 controls the steering force required for steering the subject vehicle 22 using a steering actuator. When determining that the subject vehicle 22 is in an avoidance required state based on the images from the imaging devices 44, the beam ECU 32 operates the display 52 and the warning speaker 54. In addition, the beam ECU 32 supplies a braking force control signal to the brake ECU 60 in order to make the brake ECU 60 apply the brake to the subject vehicle 22, or supplies a steering force control signal to the steering ECU 62 in order to make the steering ECU 62 steer the subject vehicle 22 so that the avoidance required state is eliminated.

The brake ECU 60 detects the vehicle speed of the subject vehicle 22 using a vehicle speed sensor and the like, and detects the motion state quantity of the subject vehicle 22 using a yaw rate sensor, a longitudinal acceleration sensor, a lateral acceleration sensor, and the like. The steering ECU 62 detects the steering angle of the subject vehicle 22 using a steering angle sensor and the like, and the steering force of the subject vehicle 22 using a steering torque sensor and the like. These detection signals are all supplied to the beam ECU 32. The beam ECU 32 detects the vehicle speed, motion state quantity, steering angle, and steering force based on sensor signals from the brake ECU 60 and the steering ECU 62.

Further, a camera 64, which is provided on an upper portion ahead of the driver's seat in the vehicle compartment, is connected to the beam ECU 32. The camera 64 is oriented to the driver's face, and generates the image of the driver's face. The image generated by the camera 64 is supplied to the beam ECU 32. The beam ECU 32 detects the degree of the driver's concentration on driving based on the image from the camera 64.

When the driver concentrates on driving, the driver continues to drive the vehicle with the face toward the front of the vehicle. On the other hand, when the driver does not concentrate on driving, the driver frequently drives the vehicle without turning the face toward the front of the vehicle. When the driver drives the vehicle with the face toward the front of the vehicle, the driver's face is symmetrical in the image from the camera 64. On the other hand, when the driver drives the vehicle without turning the face toward the front of the vehicle, the driver's face is asymmetrical. Accordingly, the beam ECU 32 performs edge processing on the image from the camera 64 in order to detect the driver's face, and determines whether the driver drives the vehicle with the face toward the front, or drives inattentively, based on the distribution of the edges. Then, the beam ECU 32 detects the degree of the driver's concentration on driving based on the duration during which the driver drives the vehicle with the face toward the front.

Next, a description will be given on a region of a road surface on which the beam radiators 24 in the movable body safety system 20 according to the embodiment of the invention is to radiate the visible beams, that is, patterns which are to be reflected on the road surface using the visible light beams.

In the embodiment of the invention, first, the beam ECU 32 calculates a running trajectory on which the subject vehicle 22 is presumed to run, based on the detected vehicle speed, motion state quantity, steering angle, and steering force. Then, the beam ECU 32 calculates each of right and left border lines between a portion where the vehicle body passes and portions where the vehicle body does not pass, that is, lines which the outermost portion of the vehicle touches (hereinafter, the line is referred to as a vehicle body circumscribing line) on the assumption that the vehicle runs on the running trajectory. Then, the beam ECU 32 assigns each of the right and left vehicle body circumscribing lines as a pattern which is to be reflected on the road surface by the visible light beam, and extracts a portion corresponding to the vehicle speed, acceleration, deceleration, and the like from the entire the vehicle body circumscribing lines. The beam ECU 32 operates the scan actuator 38 of each of the two beam radiators 24 on the right side and two beam radiators 24 on the left side.

Figure 3:
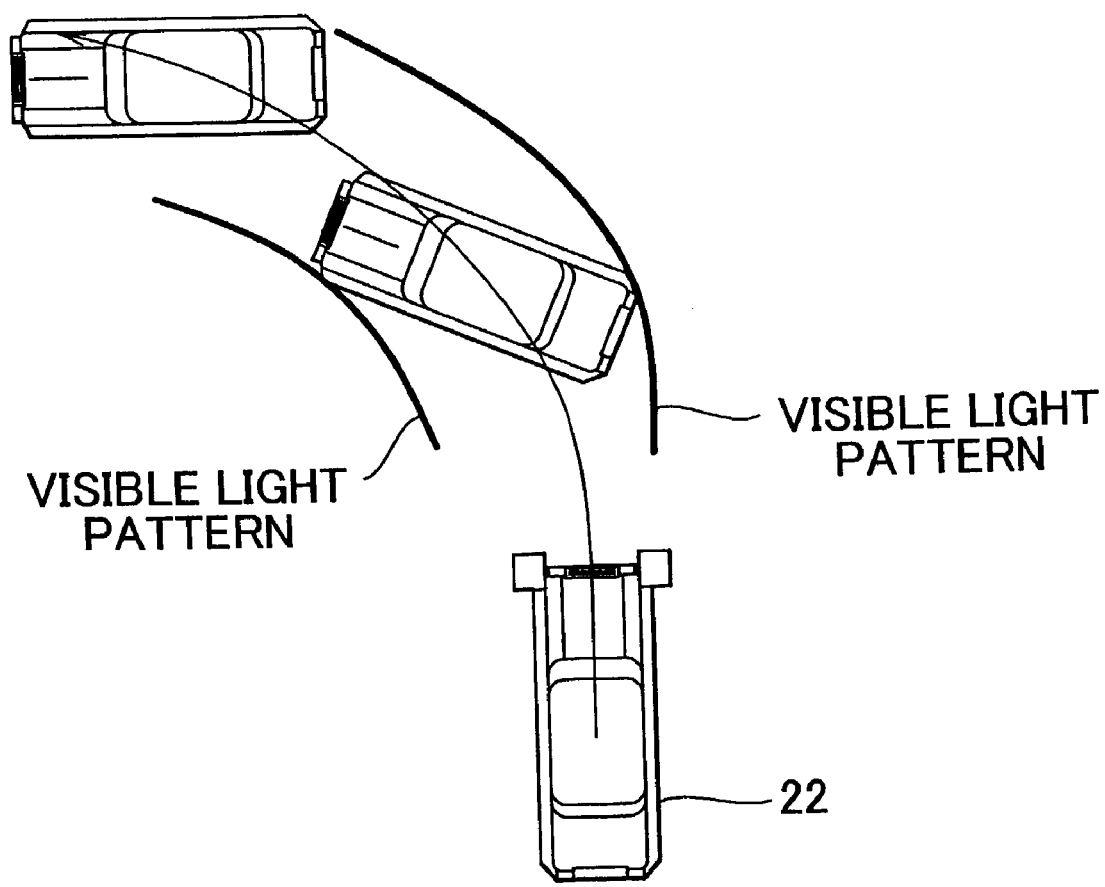
FIG. 3 is a schematic diagram showing visible light patterns reflected on a road surface by visible light beams when a vehicle skids in the embodiment of the invention, which are seen from above the vehicle.

FIG. 3 is a schematic diagram showing visible light patterns reflected on a road surface by visible light beams when the vehicle 22 skids in the embodiment of the invention, which are seen from above the vehicle. When the vehicle 22 moves straight, the visible light patterns, which are reflected on the road surface by the visible light beams, are formed nearly along the side surfaces of the vehicle body. Also, when the vehicle 22 moves forward and turns without skidding, the inside visible light pattern, which is reflected on the road surface while turning, is formed along the inside rear portion of the vehicle 22. The outside visible light pattern, which is reflected on the road while turning, is formed along the outside front portion of the vehicle 22. On the other hand, when the vehicle 22 skids, the visible light patterns, which are reflected on the road surface while turning, are formed along the vehicle body circumscribing lines based on the motion state of the vehicle 22, as shown in FIG. 3.

Thus, according to the embodiment of the invention, the visible light patterns according to the trajectory on which the subject vehicle 22 is presumed to run can be reflected on the road surface by the visible light beams radiated in the visible light region which a person can visually recognize. When such an indication is formed, even if a passerby or a driver of another vehicle cannot see the vehicle itself, the passerby or the driver can recognize that the vehicle exists in the vicinity by visually recognizing the indication on the road surface. In addition, the driver of the subject vehicle can confirm the course of the subject vehicle using a diorama. Therefore, according to the movable body safety system 20 in the embodiment of the invention, it is possible to call attention of others to the existence of the subject vehicle 22, and to quickly inform others of the existence of the subject vehicle 22 by the indication which is formed on the road surface by the subject vehicle 22. In addition, it is possible to allow the driver of the subject vehicle 22 to recognize the course thereof. Therefore, according to this system, it is possible to improve the safety when the vehicle 22 runs.

At this time, the visible light patterns, which are reflected on the road surface, are formed according to the behavior of the vehicle derived from the motion state of the vehicle 22. More specifically, the visible light patterns are the vehicle body circumscribing lines on the right and left sides of the running trajectory on which the vehicle 22 is presumed to run. The passerby, the driver of the other vehicle, or the like can recognize that the subject vehicle 22 exists in the vicinity, and the region where the subject vehicle is presumed to run. Also, the driver of the subject vehicle can recognize the region where the subject vehicle is presumed to run as well. Therefore, according to the embodiment of the invention, it is possible to inform others of the existence and the behavior of the subject vehicle 22, and to allow the drivers of the subject vehicle 22 and the other vehicle to recognize the behavior of the subject vehicle 22. Thus, it is possible to further improve the safety in vehicle running.

Figure 4A:
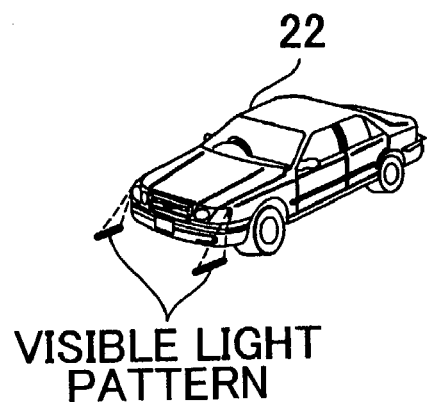
FIGS. 4A and 4B are diagrams explaining a method for setting the positions and the lengths of the patterns formed by the visible light beams radiated by beam radiators provided in the front portion of the vehicle body in the embodiment of the invention.
Figure 4B:
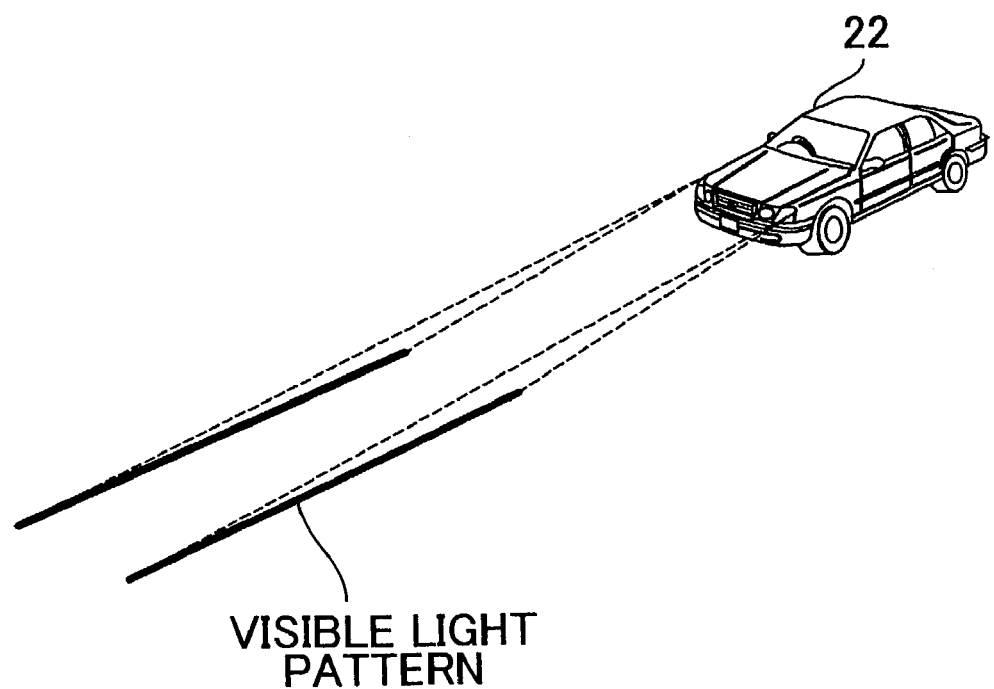

FIGS. 4A and 4B are diagrams explaining a method for setting the positions and the lengths in the vehicle moving direction of the patterns which are to be reflected on the road surface by the visible light beams radiated by the beam radiators provided on the right and left sides in the front portion of the vehicle body in the embodiment of the invention. FIG. 4A shows a case where the vehicle 22 stops, and a case where the vehicle 22 runs at a slightly low speed. FIG. 4B shows a case where the vehicle 22 runs at a high speed, a case where the vehicle 22 takes off and a case where the vehicle 22 accelerates.

In the case where the vehicle 22 stops and in the case where the vehicle 22 runs at a slightly low speed, since the stopping distance due to braking is relatively short, safe running is sufficiently ensured without informing a person ahead of, or far from the vehicle 22, or the like of the existence of the vehicle 22. On the other hand, in the case where the vehicle 22 runs at a high speed, in the case where the vehicle 22 takes off and in the case where the vehicle 22 accelerates, since the stopping distance due to braking is relatively long, it is necessary to inform a person or the like ahead of, and far from the vehicle 22 of the existence of the vehicle 22 in order to ensure the safe running of the vehicle 22.

Thus, as shown in FIG. 4A, in the case where the vehicle 22 stops and in the case where the vehicle 22 runs at a slightly low speed, visible light beams are radiated toward the right and left sides respectively from the two beam radiators 24 in the front portion of the vehicle body so that the short visible light patterns which are short in the vehicle moving direction are reflected on the road surface in the vicinity of the vehicle. On the other hand, as shown in FIG. 4B, in the case where the vehicle 22 runs at a high speed and in the case where the vehicle 22 takes off and accelerates, the visible light beams are radiated so that the visible light patterns which are relatively long in the vehicle moving direction are reflected relatively far from the vehicle. That is, in the embodiment of the invention, with regard to the visible light patterns formed by the visible light beams radiated by the beam radiators 24 in the front portion of the vehicle body, the positions thereof ahead of the vehicle 22 and the lengths thereof are changed according to the forward speed and acceleration of the vehicle 22.

Accordingly, in the embodiment of the invention, since the visible light patterns are reflected according to the forward speed and acceleration of the vehicle 22 on the road surface ahead of the vehicle 22, it is possible to allow a passerby around the vehicle, a driver of another vehicle, or the like to recognize the speed and acceleration of the vehicle 22 to some extent, and to inform others of the existence of the subject vehicle 22 to a necessary and sufficient extent.

Figure 5A:
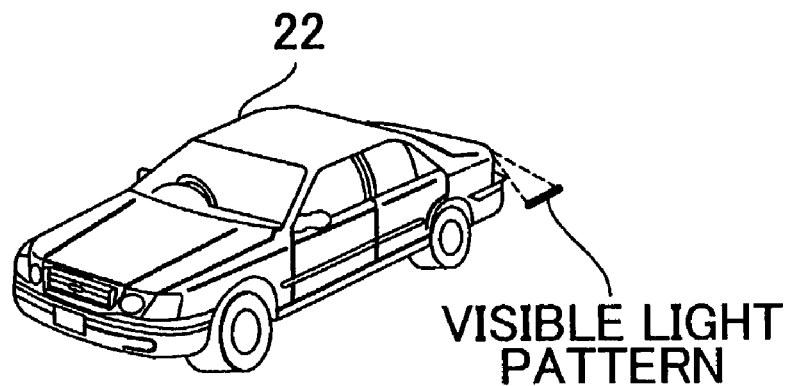
FIGS. 5A and 5B are diagrams explaining a method for setting the positions and the lengths of the patterns formed by the visible light beams radiated by the beam radiators provided in the rear portion of the vehicle in the embodiment of the invention.
Figure 5B:
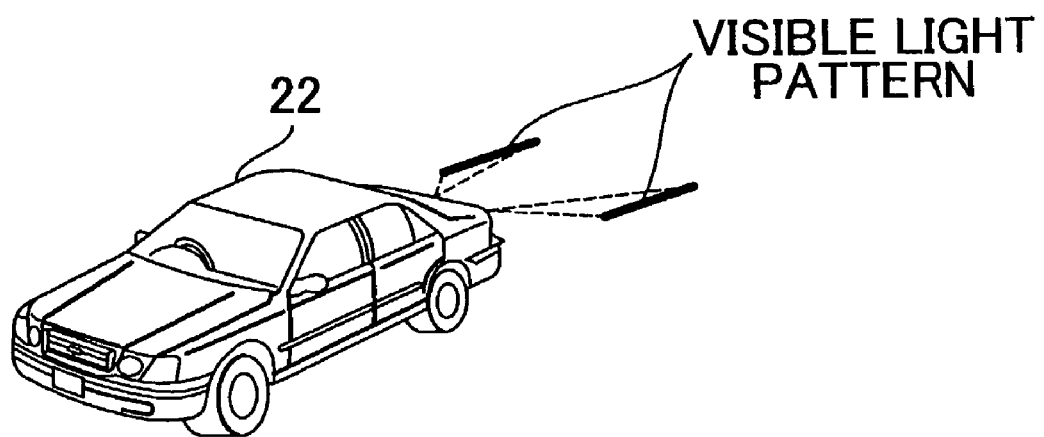

FIGS. 5A and 5B are diagrams explaining a method for setting the positions and the lengths in the vehicle moving direction of the patterns which are to be reflected on the road surface by the visible light beams radiated by the beam radiators provided on the right and left sides in the front portion of the vehicle body in the embodiment of the invention. FIG. 5A shows a case where the vehicle 22 runs forward at a constant speed, and FIG. 5B shows a case where the vehicle 22 decelerates and a case where the vehicle 22 moves back.

In the case where the vehicle 22 runs at a constant speed, since the running of the vehicle 22 does not affect the running of a succeeding vehicle, it is not so necessary to inform the succeeding vehicle's driver or the like of the running state of the subject vehicle 22. On the other hand, in the case where the vehicle 22 decelerates and in the case where the vehicle 22 moves back, since the running of the vehicle 22 affects the running of the succeeding vehicle, it is necessary to quickly inform the succeeding vehicle's driver or the like of the running state of the subject vehicle 22 (that is, deceleration, back movement.)

Thus, as shown in FIG. 5A, in the case where the vehicle 22 runs at a constant speed, the visible light beams are radiated toward the right and left sides respectively from the two beam radiators 24 provided in the rear portion of the vehicle body so that the visible light patterns which are short in the vehicle moving direction are reflected on the road surface in the vicinity of the vehicle. On the other hand, as shown in FIG. 5B, in the case where the vehicle 22 decelerates and in the case where the vehicle 22 moves back, the visible light beams are radiated so that the visible light patterns which are long in the vehicle moving direction are reflected relatively far from the vehicle 22. That is, in the embodiment of the invention, with regard to the visible light patterns formed by the visible light beams radiated by the beam radiators 24 in the rear portion of the vehicle body, the positions thereof behind the vehicle 22 and the lengths thereof are changed according to the backward speed and acceleration of the vehicle 22.

Accordingly, in the embodiment of the invention, since the visible light patterns are reflected according to the backward deceleration of the vehicle 22 and whether or not the vehicle 22 moves back, it is possible to allow a passerby around the vehicle 22, a driver of another vehicle, or the like to recognize the deceleration state of the vehicle 22, and whether or not the vehicle 22 moves back. Particularly, it is possible to call attention of the succeeding vehicle's driver to the deceleration or back movement.

Figure 6:
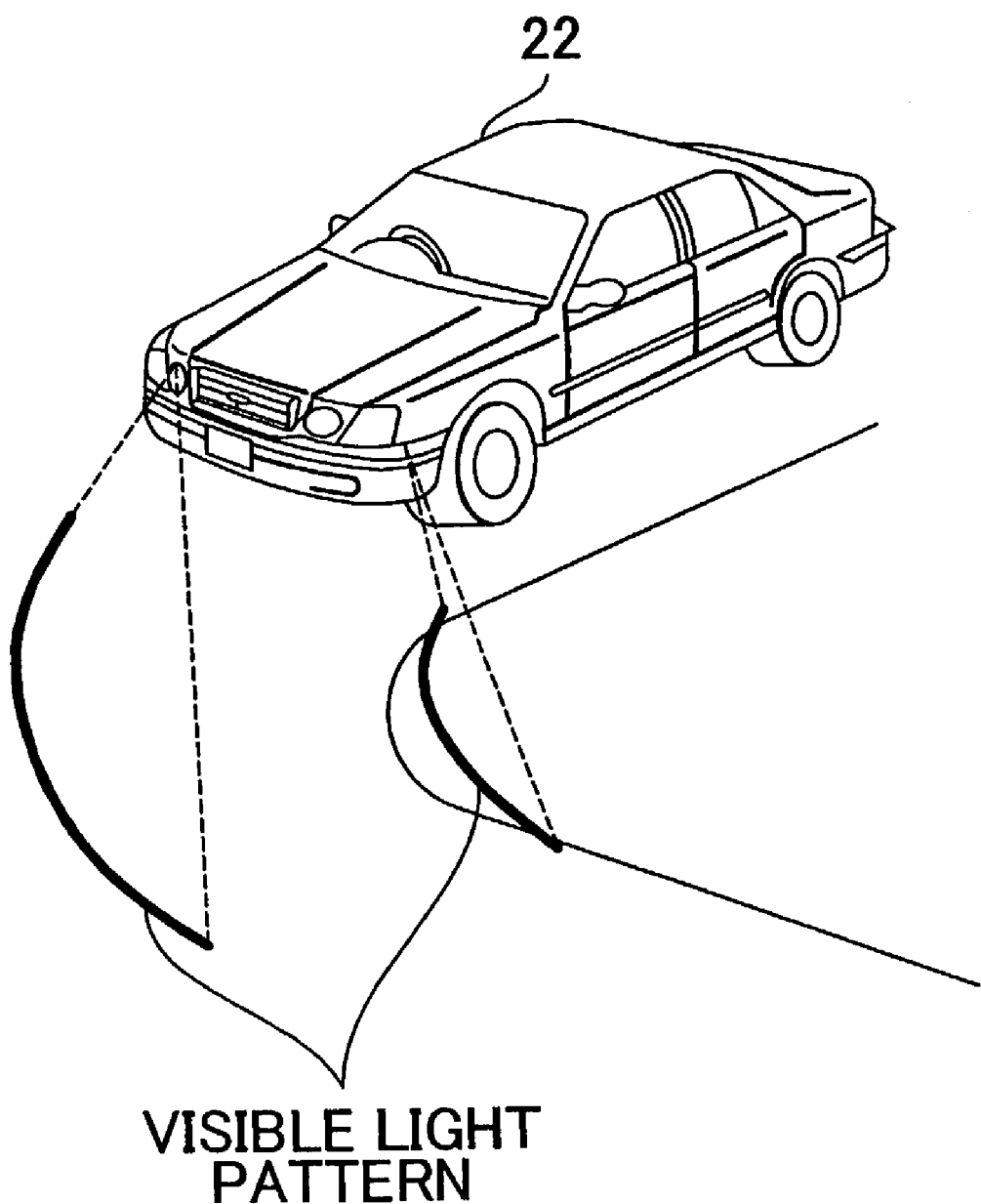
FIG. 6 is a diagram explaining a method for setting the positions of the patterns formed by the visible light beams radiated by the beam radiators when the vehicle turns in the embodiment of the invention.

FIG. 6 is a diagram explaining a method for setting the positions of the visible light patterns formed by the visible light beams radiated by the beam radiators 24 when the vehicle 22 turns in the embodiment of the invention. As shown in FIG. 6, when the vehicle 22 turns, the visible light beams are radiated from the two beam radiators 24 on the right side and the two beam radiators 24 on the left side so that the visible light patterns are reflected on the road surface along the running trajectory on which the vehicle 22 is presumed to run, based on the vehicle motion state such as the vehicle speed, steering angle, and yaw rate.

In other words, in the embodiment of the invention, with regard to the visible light patterns formed by the visible light beams radiated by the beam radiators 24, the positions there of are changed according to the vehicle motion state. More specifically, when the vehicle moves straight, the visible light patterns are positioned ahead of the vehicle. In addition, when the vehicle turns, the visible light patterns are positioned obliquely to the vehicle. Thus, in the embodiment of the invention, the visible light patterns are reflected on the road surface according to the motion state of the vehicle 22. Therefore, a passerby around the vehicle 22, a driver of another vehicle, or the like, particularly, a pedestrian walking on a pedestrian crossing at an intersection, a driver of a succeeding motorcycle, a bicycle, or the like can be informed of the presumed running trajectory of the vehicle 22. Thus, according to the embodiment of the invention, it is possible to improve the safety when the vehicle 22 runs.

Figure 7:
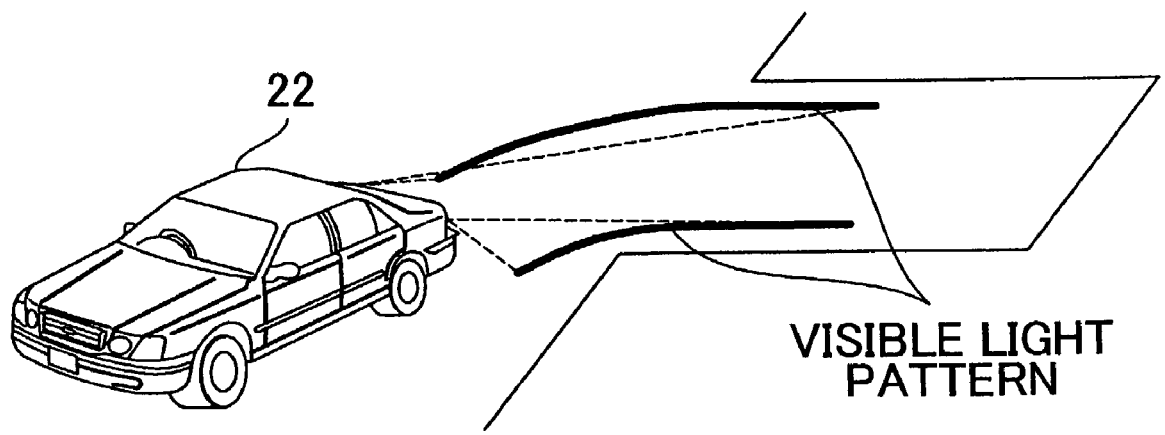
FIG. 7 is a diagram explaining a method for setting the positions of the patterns formed by the visible light beams radiated by the beam radiators provided in the rear portion of the vehicle when the vehicle moves back and is parked in the embodiment of the invention.

FIG. 7 is a diagram explaining a method for setting the positions of the visible light patterns formed by the visible light beams radiated by the beam radiators provided on the right and left sides in the rear portion of the vehicle body when the vehicle moves back and is parked in the embodiment of the invention. As shown in FIG. 7, when the driver operates a shift lever to a parking position so that the vehicle 22 moves back and is parked, the visible light beams are radiated from the two beam radiators 24 in the rear portion of the vehicle body so that the visible light patterns having a given length are reflected on the road surface behind the vehicle along the running trajectory on which the vehicle 22 is presumed to run.

In other words, in the embodiment of the invention, when the vehicle moves back and is parked, the visible light patterns formed by the visible light beams radiated by the beam radiators 24 in the rear portion of the vehicle body have a given length, and the positions of the visible light patterns are changed according to the vehicle motion state. More specifically, when the vehicle 22 moves back and turns to the left, the visible light patterns are positioned obliquely to the vehicle 22 on the left side. When the vehicle 22 moves back and turns to the right, the visible light patterns are positioned obliquely to the vehicle 22 on the right side. Thus, in the embodiment of the invention, the visible light patterns are reflected on the road surface behind the vehicle 22 according to the vehicle motion state when the vehicle moves back and is parked. Therefore, a person around the vehicle 22, a driver of another vehicle, particularly a person in a parking space can be informed of the fact that the vehicle 22 moves back, and the presumed running trajectory at that time. In addition, the driver of the vehicle 22 can see the visible light patterns reflected on the road surface by a diorama. Thus, according to the embodiment of the invention, it is possible to improve the safety in parking, and to assist the operation for parking.

Also, when the degree of the driver's concentration on driving is high, even if the vehicle 22 has trouble in running, the driver can perform an avoidance operation for dealing with the difficult situation quickly. Therefore, a region of the road surface which the movable body safety system 20 is to monitor may be small. In addition, a region in which a passerby or the like is to be informed of the existence of the subject vehicle 22 by the movable body safety system 20 may be small as well. On the other hand, when the driver frequently drives the vehicle inattentively, and the degree of the driver's concentration on driving is lowered, if the vehicle 22 has trouble in running, the driver may be slow in performing the avoidance operation. Therefore, the region of the road surface which the movable body safety system 20 is to monitor needs to be large. In addition, it is suitable to inform others of the existence of the subject vehicle 22.

Accordingly, in the embodiment of the invention, the visible light beams are radiated from the beam radiators 24 so that the visible light patterns having lengths in the vehicle moving direction, which correspond to the detected degree of the driver's concentration on driving, are reflected on the road surface. More specifically, the visible light beams are radiated from the beam radiators 24 so that the short visible light patterns are reflected when the degree of the driver's concentration on driving is relatively high, and the extended visible light patterns are reflected when the degree of the driver's concentration on driving is relatively low. In other words, the lengths in the vehicle moving direction of the visible light patterns formed by the visible light beams can be extended or shortened according to the degree of the driver's concentration on driving.

Accordingly, in the embodiment of the invention, the visible light patterns having the lengths in the vehicle moving direction corresponding to the degree of the driver's concentration on driving are reflected on the road surface. Therefore, when the degree of the driver's concentration on driving is low, it is possible to inform others of the existence of the subject vehicle 22 quickly. As a result, according to the embodiment of the invention, it is possible to allow others to recognize the existence of the subject vehicle 22 at an appropriate time corresponding to the degree of the driver's concentration on driving.

Figure 8A:
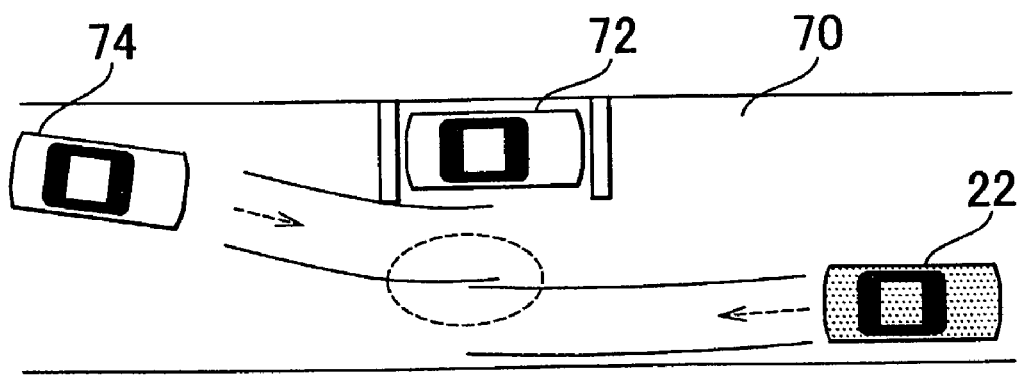
FIG. 8 is a schematic diagram showing the state where two vehicles equipped with the movable body safety systems according to the embodiment of the invention pass each other.
Figure 8B:
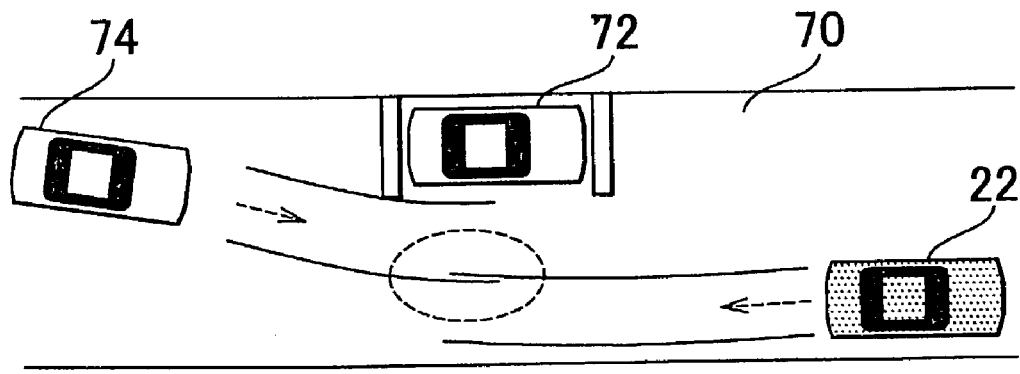

FIG. 8 is a schematic diagram showing the state where two vehicles 22, 74 which are equipped with the movable body safety systems according to the embodiment of the invention pass each other. Suppose that the vehicle 22 and the oncoming vehicle 74 pass each other, in a case where because a stopping vehicle 72 exists on a road 70 on which the vehicle 22 runs, or for other reasons, a portion of the road where vehicles can run becomes narrow. Each of the vehicles 22, 74 radiates the visible light beams from the beam radiators 24 so that the visible light patterns are reflected on the road surface according to the presumed running trajectory of the vehicle. Therefore, the visible light patterns corresponding to each of the vehicles 22, 74 are reflected on the road surface.

Thus, the driver of each of the vehicles 22, 74 can visually confirm the visible light patterns formed by the driver's subject vehicle, and the visible light patterns formed by the oncoming vehicle. In addition, the driver of each of the vehicles 22, 74 can visually recognize the positional relation between both the patterns by a diorama. Therefore, according to the embodiment of the invention, it is possible to allow the driver to confirm whether the subject vehicle and the oncoming vehicle radiating the visible light beams can pass each other, or whether there is a space for allowing both the vehicles to pass each other.

Note that, at this time, an additional connected indication of the visible light patterns formed by the visible light beams of the subject vehicle may be performed in a region further ahead of the vehicle, or in the direction away from the other pattern or an obstacle which is obtained based on the images generated by the imaging devices 44. In this configuration, it is possible to allow the driver to confirm whether the subject vehicle and the oncoming vehicle can pass each other, or whether there is a space for allowing both the vehicles to pass each other.

Figure 9:
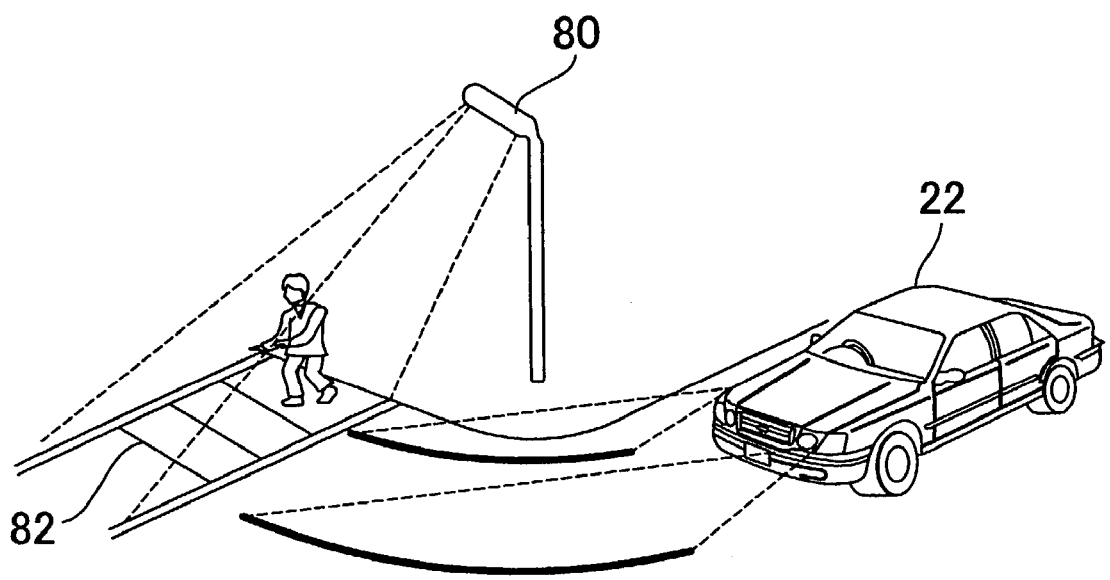
FIG. 9 is a diagram explaining an infrastructure facility in the embodiment of the invention.
Figure 10:
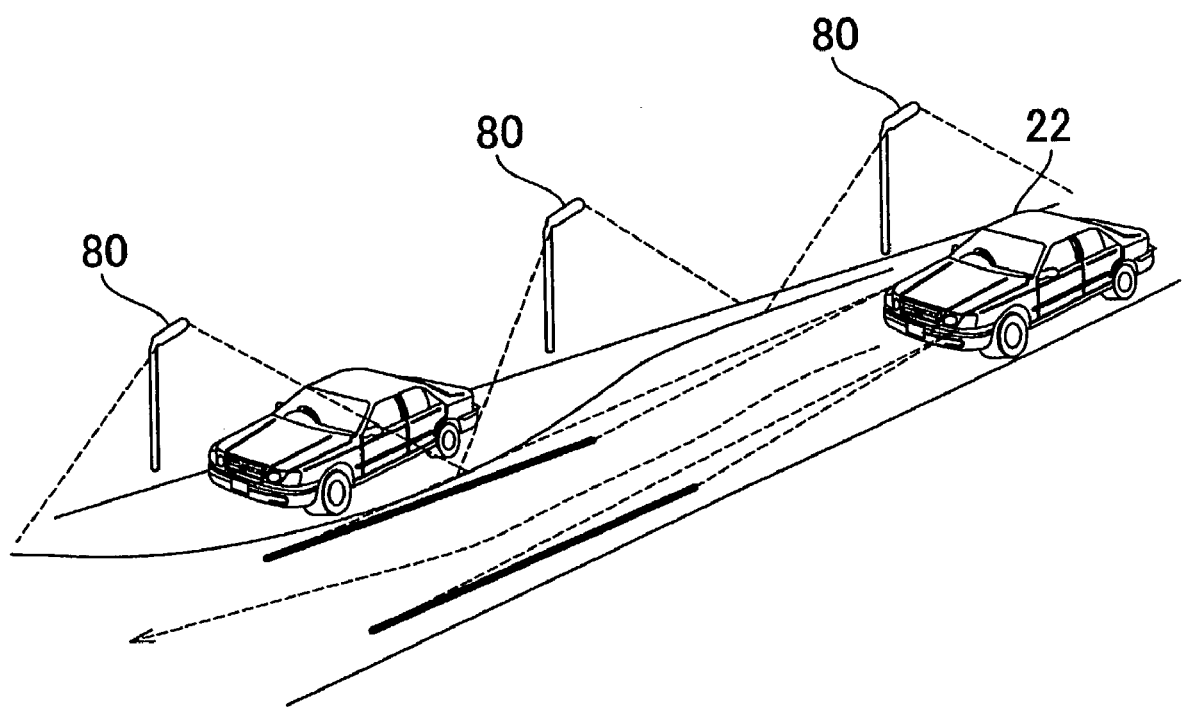
FIG. 10 is a diagram explaining the infrastructure facility in the embodiment of the invention.

FIG. 9 and FIG. 10 are diagrams explaining an infrastructure facility in the embodiment of the invention. In the embodiment of the invention, the infrastructure facility includes a plurality of beam radiators 80 which is provided along a road. Each of the beam radiators 80 includes a beam generator including a semiconductor laser for generating an invisible beam having a wavelength in the infrared light region. The infrastructure has a traffic sign, such as a pedestrian crossing 82 and "No Throughfare" section depicted on a road surface for a driver of a vehicle, a motorcycle, and the like, and a pedestrian crossing an intersection. As shown in FIG. 9, the beam radiator 80 provided at the intersection radiates the invisible beams to form patterns in such a manner as to circumscribe the outer edges of the pedestrian crossing 82.

Also, the beam radiator 80 provided along the road normally radiates the invisible light beams such that the patterns are formed along a shoulder of the road. The infrastructure facility has obstacle detecting sensors (not shown) provided at given intervals on the roadside. The obstacle detecting sensors are provided in order to detect an obstacle such as a vehicle parked on the road. When the infrastructure facility detects that an obstacle such as a parked vehicle exists on the road using the obstacle detecting sensors, the beam radiators 80 provided along the road radiate the invisible light beams to form the pattern lines in such a manner as to avoid the obstacle as shown in FIG. 10.

Next, the operations of the movable body safety system 20 according to the embodiment of the invention will be described.

In the embodiment of the invention, while the beam radiators 24 radiate the visible light beams, the beam ECU 32 extracts the visible light patterns formed by the subject vehicle 22, the visible light patterns formed by the other vehicle, and the invisible light patterns formed by the infrastructure, by processing the images from the imaging devices 44. Then, the beam ECU 32 determines whether the extracted patterns include only desired visible light patterns formed by the subject vehicle 22 (that is, the subject patterns). If the ECU 32 determines that the extracted patterns include only the subject patterns, it determines that the other vehicle or the infrastructure facility to which the subject vehicle 22 is to pay attention does not exist around the subject vehicle 22. In this case, the ECU 32 does not give commands for the display 52, the warning speaker 54, the brake ECU 60, and the steering ECU 62.

If the beam ECU 32 determines that the extracted patterns include the visible or invisible light patterns (that is, the other patterns) other than the subject patterns, it determines that the other vehicle, the infrastructure facility, or the like to which the subject vehicle 22 is to pay attention may exist around the subject vehicle 22. In this case, the beam ECU 32 determines the positional relation between the subject patterns and the other patterns. If the beam ECU 32 determines that both the patterns indicating the presumed running trajectories of the vehicles are positioned such that they do not interfere with each other, for example, both the patterns are positioned in parallel, it determines that the positional relation therebetween does not cause trouble to the subject vehicle 22 during running. In this case, the beam ECU 32 does not give commands for the display 52, the warning speaker 54, the brake ECU 60, and the steering ECU 62. On the other hand, if the beam ECU 32 determines that the subject patterns and the other patterns are positioned such that they interfere with each other, for example, they intersect, or they become close to each other so that a distance therebetween becomes a predetermined value or less, it operates the display 52 and the warning speaker 54, supplies a braking force control signal to the brake ECU 60, and supplies a steering force control signal to the steering ECU 62.

Figure 11A:
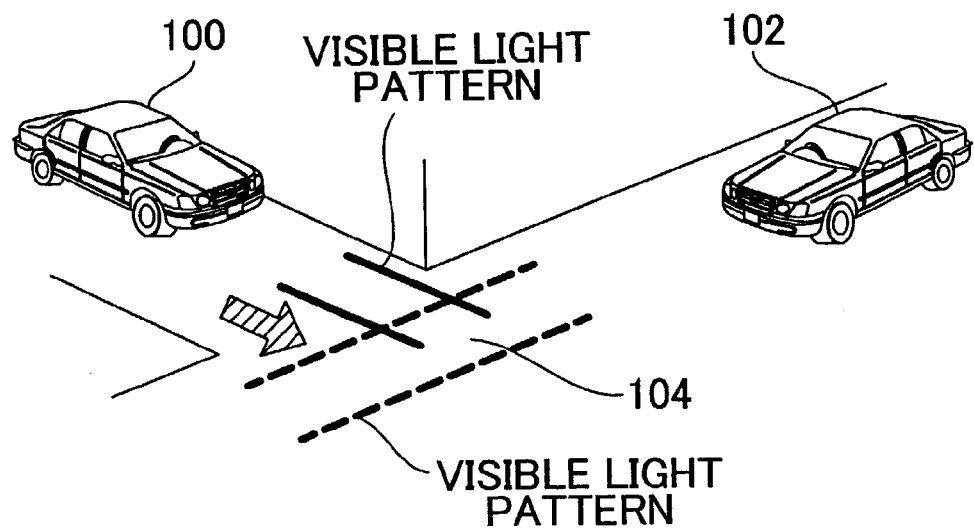
FIGS. 11A to 11D are diagrams explaining a process executed by the movable body safety system according to the embodiment of the invention when two vehicles equipped with the movable body safety system enter an intersection with poor visibility.
Figure 11B:
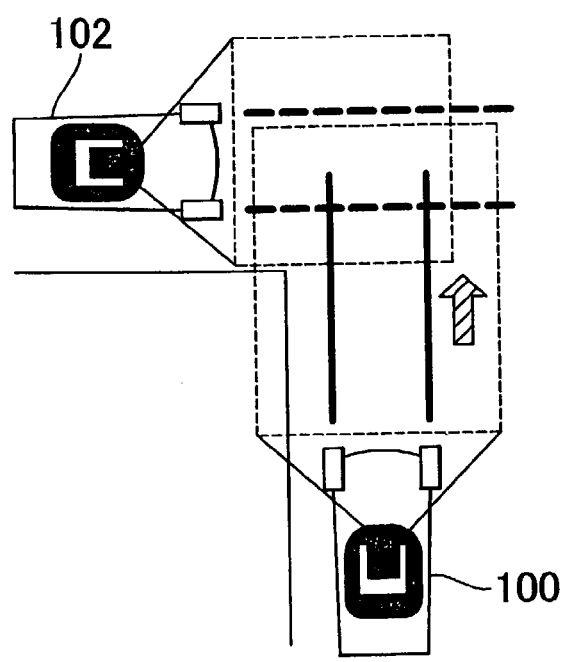
Figure 11C:
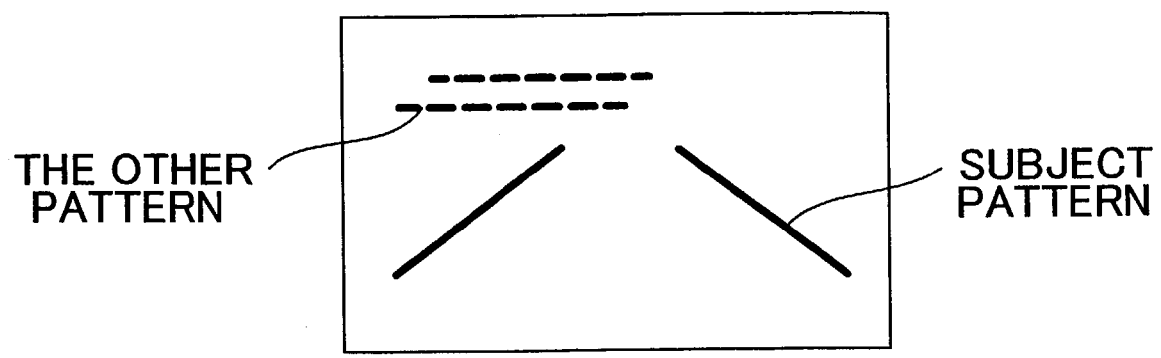
Figure 11D:
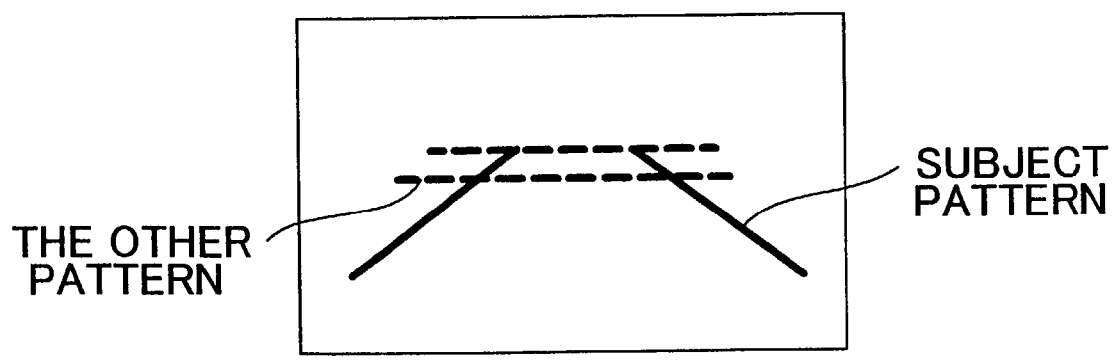

FIGS. 11A to 11D are diagrams explaining a process executed by the movable body safety system 20 according to the embodiment of the invention when two vehicles 100, 102 equipped with the movable body safety system 20 enter an intersection 104 with poor visibility. FIG. 11A is a bird's eye view showing a state where the two vehicles 100, 102 enter the intersection 104. FIG. 11B is a diagram showing this state seen from above. FIG. 11C is a schematic diagram showing an image generated by the imaging device 44 of the vehicle 100 before the visible light patterns formed by the vehicle 100 and the visible light patterns formed by the vehicle 102 interfere with each other. FIG. 11D is a schematic diagram showing an image generated by the imaging device 44 of the vehicle 100 after the visible light patterns formed by the vehicle 100 and the visible light patterns formed by the vehicle 102 interfere with each other. In FIGS. 11A to 11D, the visible light patterns formed by the vehicle 100 are indicated by solid lines, and the visible light patterns formed by the vehicle 102 are indicated by dashed lines.

As shown in FIG. 11, when the two vehicles 100, 102 enter the intersection 104 with poor visibility, both the vehicles 100, 102 radiate the visible light beams so that the visible light patterns are reflected on the road surface according to the presumed running trajectories of the vehicles. The visible light patterns reflected on the road surface by the beam radiators 24 in the front portion of the vehicle body are formed nearer to the vehicle, and the lengths thereof in the vehicle moving direction become shorter as the vehicle decelerates. Therefore, when the visible light patterns of both the vehicles 100, 102 do not interfere with each other as shown in FIG. 11C, it can be determined that at least one of the vehicles 100, 102 is positioned relatively far from the intersection 104, or the visible light patterns become short because at least one of the vehicles 100, 102 decelerates or the like. Thus, in this case, it can be determined that neither the vehicle 100 nor the vehicle 102 is in a state where attention is required during running, and there is little need for performing a running control.

On the other hand, when the visible light patterns formed by both the vehicles 100, 102 interfere with each other as shown in FIGS. 11A, 11B and 11D, both the vehicles 100, 102 are positioned close to the intersection 104. In other words, it can be determined that both the vehicles 100, 102 are close to each other, or the visible light patterns become long because at least one of the vehicles 100, 102 runs at a high speed. Thus, in this case, it can be determined that the vehicles 100, 102 are in a state where attention is required during running, and the running control needs to be performed.

As mentioned above, the visible light patterns formed by the vehicle indicate the presumed running trajectory of the vehicle. Therefore, when the two vehicles 100, 102 enter the intersection 104, both the visible light patterns intersect at substantially right angles. Also, when both the visible light patterns intersect, the visible light patterns on one side intersect at front end portions thereof, and the visible light patterns on the other side intersect at mid portions thereof. If the visible light patterns formed by the subject vehicle intersect at the front end portions thereof, and the front end portions intersect the other patterns at the front face in a direction in parallel with the moving direction of the subject vehicle as shown in FIG. 11D, it can be determined that the vehicle arrives at the intersection 104 later than the other vehicle does. Therefore, it is suitable to call the driver's attention in order to avoid the collision with the other vehicle, and to decelerate the subject vehicle. On the other hand, when the visible patterns formed by the subject vehicle intersect at the mid portions thereof, it can be determined that the subject vehicle arrives at the intersection 104 earlier than the other vehicle does. Therefore, it is sufficient to driver's attention without decelerating the subject vehicle.

In the embodiment of the invention, when the subject patterns extracted from the images generated by the imaging devices 44 intersect the other patterns at the front end portions thereof, and the front end portions intersect the other patterns at the front face, a warning sound for informing the existence of the other vehicle or the like is issued from the warning speaker 54 to the driver, and the brake is applied so as to decelerate the subject vehicle. When the subject patterns intersect the other patterns at the mid portions thereof, a warning sound for informing the existence of the other vehicle is issued from the warning speaker 54 to the driver. According to this process, a state where attention is required in the subject vehicle is determined based on a relation between the subject patterns and the other patterns in the images generated by the imaging devices 44. In addition, when the two vehicles 100, 102 enter the intersection 104 with poor visibility as shown in FIG. 11, appropriate support can be given for each of the vehicles 100, 102.

Figure 12A:
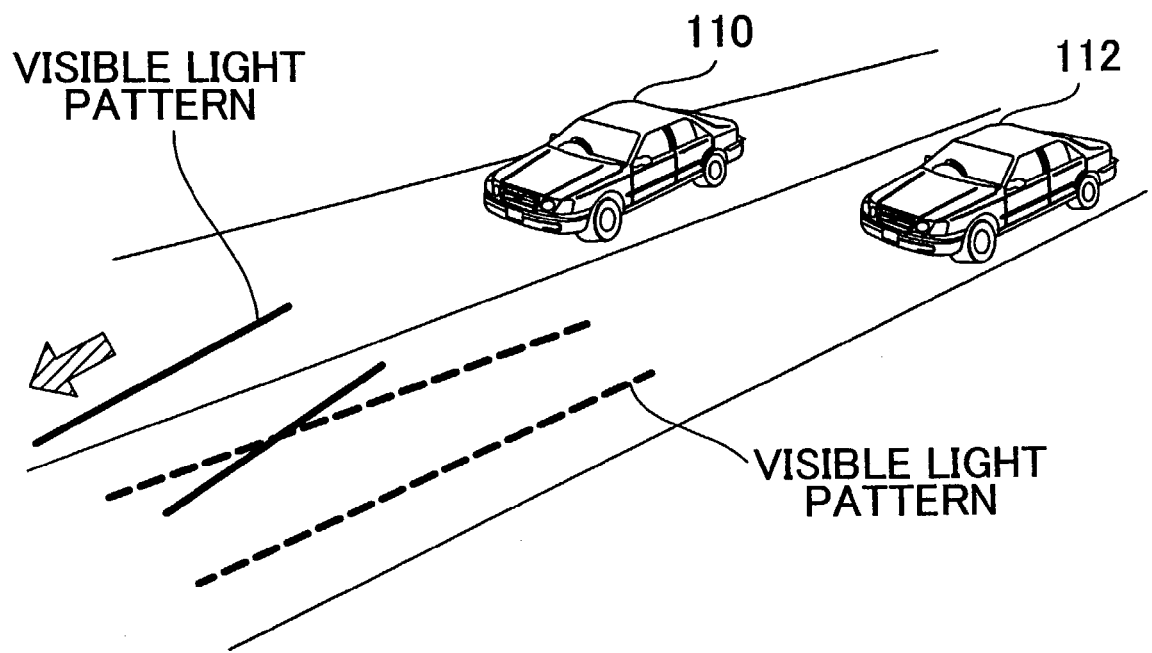
FIGS. 12A to 12D are diagrams explaining a process executed by the movable body safety system according to the embodiment of the invention when two vehicles equipped with the movable body safety system run in different lanes in the same direction, and one of the vehicle changes lanes so as to be ahead of the other vehicle in the adjacent lane.
Figure 12B:
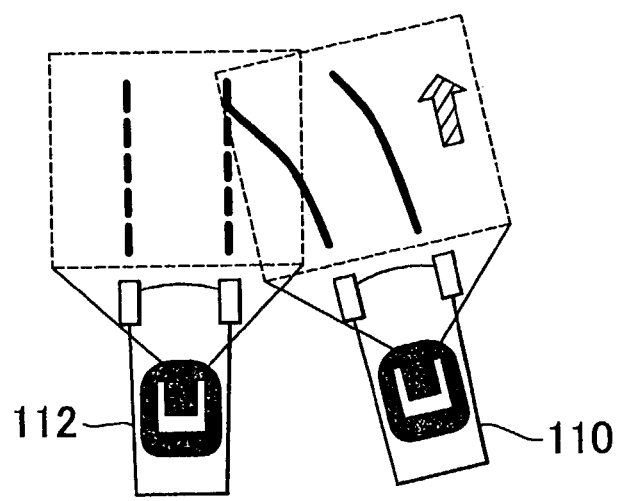
Figure 12C:
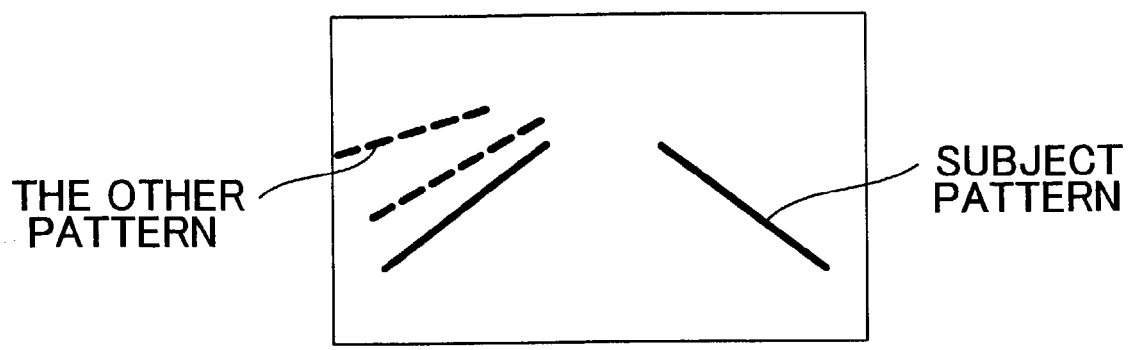
Figure 12D:
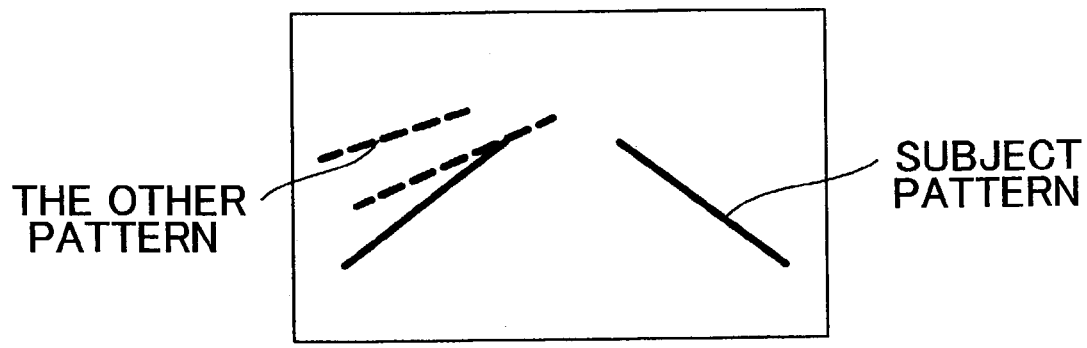

FIGS. 12A to 12D are diagrams explaining a process executed by the movable body safety system 20 according to the embodiment of the invention when two vehicles 110, 112 equipped with the movable body safety system 20 run in different lanes in the same direction, and the vehicle 110 changes lanes so as to be ahead of the other vehicle 112 in the adjacent lane. FIG. 12A is a bird's eye view showing the state where the vehicle 110 changes lanes so as to be ahead of the vehicle 112. FIG. 12B is a diagram showing the state seen from above. FIG. 12C is a schematic diagram showing an image generated by the imaging device of the vehicle 110 before the visible light patterns formed by the vehicle 110 and the visible light patterns formed by the vehicle 112 interfere with each other. FIG. 12D is a schematic diagram showing an image generated by the imaging device of the vehicle 110 after the visible light patterns formed by the vehicle 110 and the visible light patterns formed by the vehicle 112 interfere with each other. In FIGS. 12A to 12D, the visible light patterns formed by the vehicle 110 are indicated by solid lines and the visible light patterns formed by the vehicle 112 are indicated by dashed lines.

As shown in FIG. 12, under a condition where the two vehicles 110, 112 run in different lanes in the same direction, both the vehicles 110, 112 radiate the visible light beams so that the visible light patterns are reflected on the road surface according to the presumed running trajectories of the vehicles 110, 112. When the visible light patterns of both the vehicles 110, 112 do not interfere with each other as shown in FIG. 12C, it can be determined that both the vehicles 110, 112 run in substantially parallel. Thus, in this case, neither the vehicle 110 nor the vehicle 112 is in a state where attention is required during running, and there is little need for performing the running control.

On the other hand, when the visible light patterns of both the vehicles 110, 112 interfere with each other as shown in FIGS. 12A, 12B, and 12D because the vehicle 110 change lanes so as to be ahead of the vehicle 112, it can be determined that both the vehicles 110, 112 are close to each other. Thus, in this case, it can be determined that the vehicles 110, 112 are in a state where attention is required, and the running control needs to be performed.

As mentioned above, since the visible light patterns formed by the vehicle indicate the presumed running trajectory of the vehicle, when the two vehicles 110, 112 run in different lanes in the same direction, and the vehicle 110 changes lanes toward the vehicle 112 side, both the visible light patterns are substantially in parallel and they intersect at their side portions. Also, when both the visible light patterns intersect, the visible light patterns on one side intersect at the front end portions thereof, and the visible light patterns on the other side intersect at the mid portions thereof. Under a condition where the subject vehicle is steered by the driver for changing lanes, when the visible light patterns formed by the subject vehicle intersect at the front end portions thereof, and the front end portions intersect the other patterns at the lateral face in a direction perpendicular to the subject vehicle moving direction as shown in FIG. 12D, it can be determined that the subject vehicle is changing lanes so as to be ahead of the other vehicle. In this case, it is suitable to call the driver's attention in order to stop changing lanes, and to give a steering reaction force. On the other hand, under a condition where the subject vehicle is steered by the driver for changing lanes, when the visible light patterns formed by the subject vehicle intersect the other patterns at the mid portions thereof, it can be determined that the subject vehicle can change lanes so as to be ahead of the other vehicle without causing trouble to the running of the other vehicle. In this case, it is sufficient to call the driver's attention without giving the steering reaction force.

Also, under a condition where the subject vehicle is not steered by the driver for changing lanes, when the visible light patterns formed by the subject vehicle intersect the other patterns at the lateral face thereof, it can be determined that the other vehicle is changing lanes so as to be ahead of the subject vehicle. In this case, it is sufficient to call the driver's attention to the fact that the other vehicle is changing lanes, without performing the running control.

Accordingly, in the embodiment of the invention, under a condition where the subject vehicle is steered for changing lane, when the subject patterns extracted from the images generated by the imaging devices 44 intersect at the front end portions thereof, and the front end portions intersect the other patterns at the lateral face, a warning sound for informing that changing lanes is to be stopped is issued from the warning speaker 54 to the driver, and the steering reaction force is given to the steering operation so that the subject vehicle stops changing lanes. On the other hand, under a condition where the subject vehicle is steered for changing lanes, when the subject patterns intersect the other patterns at the mid portions thereof, the warning speaker 54 issues to the driver a warning sound for informing that the other vehicle exists in the lane to which the subject vehicle is moving. In addition, under a condition where the subject vehicle is not steered for changing lanes, when the subject patterns intersect the other patterns at the lateral face, the warning sound for informing the existence of the other vehicle is issued from the warning speaker 54 to the driver.

According to the process, a state where attention is required in the subject vehicle is determined based on the relation between the subject patterns and the other patterns in the images generated by the imaging devices 44. In addition, when one of the vehicles 110, 112 running in different lanes in the same direction changes lanes so as to be ahead of the other vehicle as shown in FIG. 12A, appropriate support can be given for each of the vehicles 110, 112.

Figure 13A:
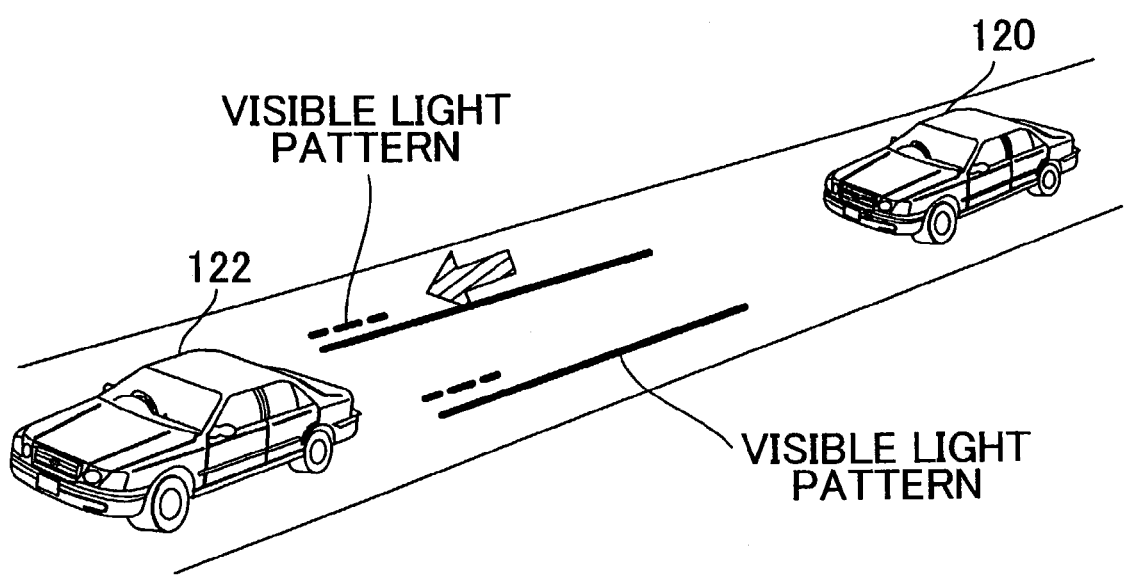
FIGS. 13A to 13C are diagrams explaining a process executed by the movable body safety system according to the embodiment of the invention when two vehicles equipped with the movable body safety system run in the same lane in the same direction, and the succeeding vehicle approaches the preceding vehicle because the preceding vehicle decelerates.

FIGS. 13A to 13C are diagrams explaining a process executed by the movable body safety system 20 according to the embodiment of the invention when two vehicles 120, 122 equipped with the movable body safety system 20 run in the same lane in the same direction, and the vehicle 120 approaches the vehicle 122 because the vehicle 122 decelerates. FIG. 13A is a bird's eye view showing a state where the vehicle 120 approaches the vehicle 122. FIG. 13B is a schematic diagram showing an image generated by the imaging device 44 of the vehicle 120 before the visible light patterns formed by the vehicle 122 enter the vehicle 120 side at the front end portions of the visible light patterns formed by the vehicle 120. FIG. 13C is a schematic diagram showing an image generated by the imaging device 44 of the vehicle 120 after the visible light patterns formed by the vehicle 122 enter the vehicle 120 side at the front end portions of the visible light patterns formed by the vehicle 120. In FIGS. 13A to 13C, the visible light patterns formed by the vehicle 120 are indicated by solid lines, and the visible light patterns formed by the vehicle 122 are indicated by dashed lines.

Figure 13:
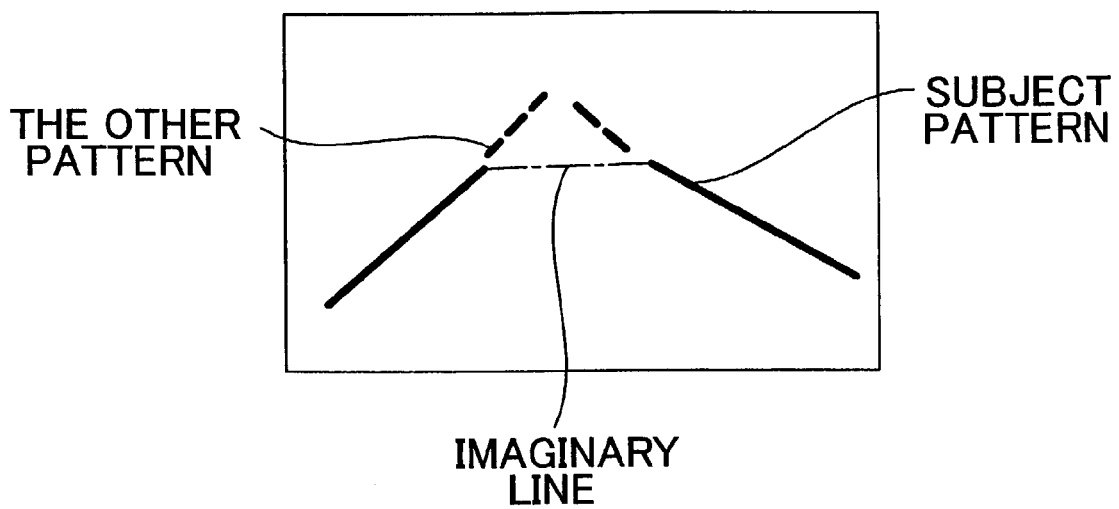
Figure 13:
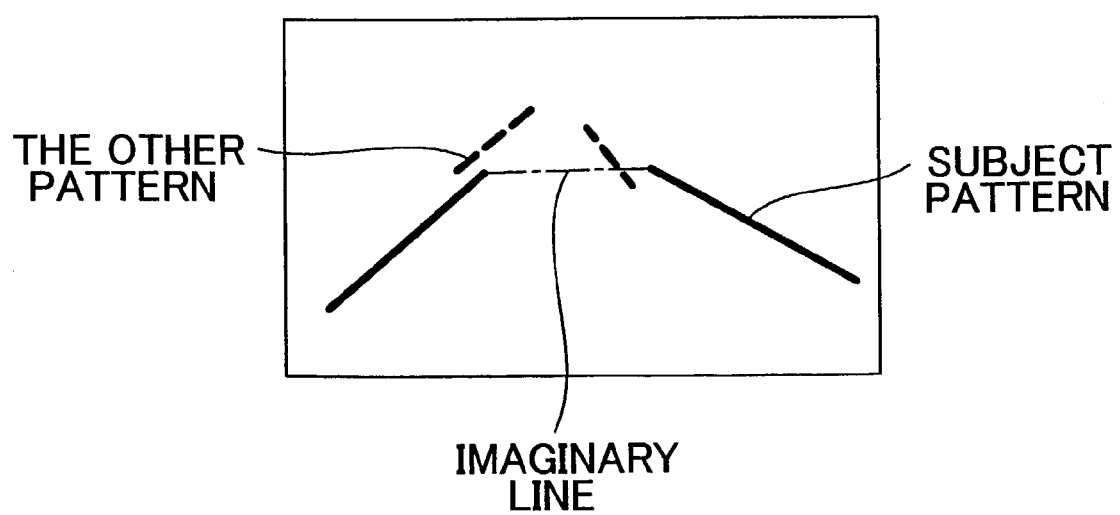

As shown in FIG. 13, under a condition where the two vehicles 120, 122 run in the same lane in the same direction, the succeeding vehicle 120 radiates the visible light beams from the beam radiators 24 in the front portion of the vehicle body so that the visible light patterns are reflected on the road surface according to the presumed running trajectory of the vehicle 120. In addition, the preceding vehicle 122 radiates the visible light beams from the beam radiators 24 in the rear portion of the vehicle body so that the visible light patterns are reflected on the road surface. When the visible light patterns formed by the preceding vehicle 122 does not go beyond an imaginary line connecting each of the right and left end portions of the visible light patterns formed by the succeeding vehicle 120 toward the succeeding vehicle 120 side as shown in FIG. 13B, it can be determined that the succeeding vehicle 120 runs keeping an appropriate distance with respect to the preceding vehicle 122. Thus, in this case, it can be determined that the succeeding vehicle is not in a state where attention is required, and there is little need for performing the running control.

On the other hand, when the visible light patterns formed by the preceding vehicle 122 goes beyond the imaginary line based on the visible light patterns formed by the succeeding vehicle 120 toward the vehicle 120 side as shown in FIG. 13A and FIG. 13C, it can be determined that the succeeding vehicle 120 approaches the preceding vehicle 122 because the preceding vehicle 122 decelerates or the succeeding vehicle 120 accelerates. Thus, in this case, it can be determined that the succeeding vehicle 120 and the preceding vehicle 122 are in a state where attention is required during running, and the running control needs to be performed.

Accordingly, in the embodiment of the invention, when the other patterns intersect while going beyond the imaginary line based on the subject patterns extracted from the images generated by the imaging devices 44 regarding the visible light beams radiated from the beam radiators 24 in the front portion of the vehicle body, a warning sound for informing that the other vehicle or the like is approaching is issued from the warning speaker 54 to the driver, and braking is performed so that the subject vehicle decelerates. On the other hand, the other patterns intersect while going beyond the imaginary line based on the subject patterns extracted from the images generated by the imaging devices 44 regarding the visible light beams radiated from the beam radiators 24 in the rear portion of the vehicle body, the warning speaker 54 issues a warning sound for informing that the other vehicle or the like is approaching. According to this process, a state where attention is required in the subject vehicle during moving is determined based on the relation between the subject patterns and the other patterns in the images generated by the imaging devices 44. In addition, when there are the vehicles 120, 122 which run in the same lane in the same direction, appropriate support can be given for each of the vehicles 120, 122.

Figure 14:
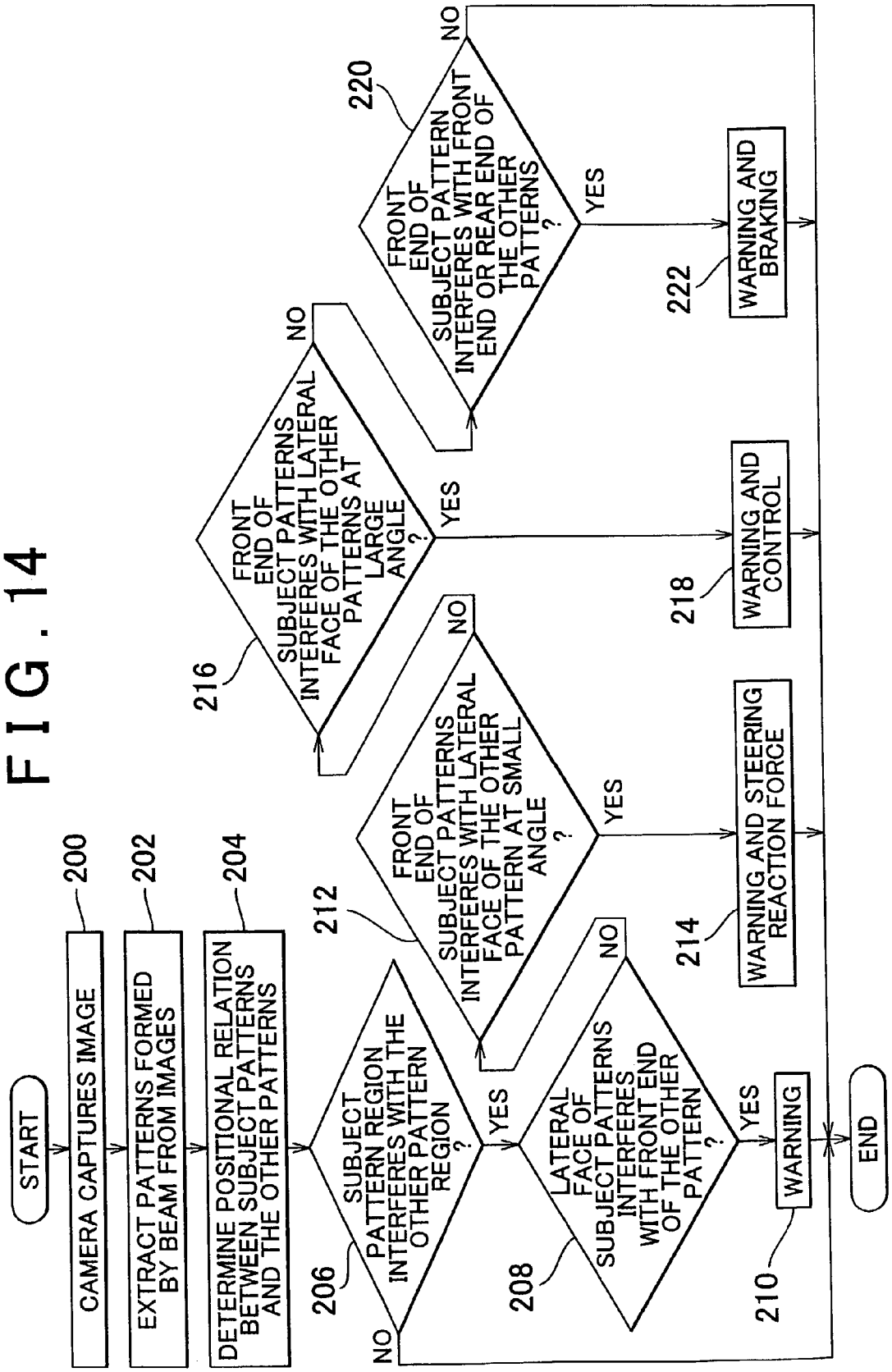
FIG. 14 is a flowchart of one example of a control routine executed by the movable body safety system according to the embodiment of the invention.

FIG. 14 is a flowchart of one example of a control routine executed by the movable body safety system 20 according to the embodiment of the invention for achieving the aforementioned function. The routine shown in FIG. 14 is repeatedly started every predetermined time. When the routine shown in FIG. 14 is started, first, the process in Step 200 is performed.

In Step 200, a process of capturing the images generated by the imaging devices is performed. In Step 202, a process of extracting the visible light patterns formed by the visible light beams and the invisible light patterns formed by the invisible light beams by processing the images captured in the above Step 200 is performed. In Step 204, when the patterns extracted in the above Step 202 include the subject patterns and the other patterns, a process of determining the positional relation between the subject patterns and the other patterns.

In Step 206, it is determined whether a region surrounded by the subject patterns (more specifically, a region which includes the aforementioned imaginary line, and which is obtained by connecting the front end portion and the rear end portion of each of the right and left subject patterns; hereinafter it is referred to as the subject pattern region.) and a region surrounded by the other patterns (hereinafter it is referred to as the other region) interfere with each other. If the regions do not interfere with each other, it can be determined that the other vehicle radiating the other patterns or an infrastructure does not exist in the vicinity of the subject vehicle 22, or even if the other vehicle or the infrastructure exists, the subject vehicle 22 is not in a state where attention is required during running. Therefore, the process does not proceed to subsequent steps any more, and the routine at this time terminates. On the other hand, if it is determined that the interference occurs, subsequently, a process in Step 208 is performed.

In Step 208, it is determined whether the lateral face side of the subject pattern region formed by the beam radiators 24 in the front portion of the vehicle body interferes with the front end side of the other pattern region. If an affirmative determination is made, it can be determined that the subject vehicle 22 runs ahead of the other vehicle radiating the other patterns, but the other vehicle is entering later than the subject vehicle 22 does, and it can be determined that the other vehicle or the like will appear from the side of the subject vehicle. In this case, it is suitable to call attention of the driver of the subject vehicle 22. Therefore, when the affirmative determination is made, a process in Step 210 is subsequently performed. On the other hand, if a negative determination is made, a process in Step 212 is subsequently performed.

In Step 210, a process of operating the warning speaker 54 is performed. After the process in Step 210 is performed, the warning speaker 54 issues a warning sound for informing the existence of the other vehicle when appropriate. When the process in Step 210 terminates, the routing at this time terminates.

In Step 212, it is determined whether the front end side of the subject pattern region interferes with the lateral face side of the other region at an angle smaller than a predetermined angle θ. If an affirmative determination is made, it can be determined that the other vehicle radiating the other patterns runs ahead of the subject vehicle 22, but the subject vehicle 22 is entering, at a sharp angle, the running lane or the like on which the other vehicle runs so as to be ahead of the other vehicle. In this case, it is suitable to call the driver's attention and perform the steering control in the subject vehicle 22 in order to avoid contact with the other vehicle. Thus, if the affirmative determination is made, a process in Step 214 is subsequently performed. On the other hand, if a negative determination is made, a process in Step 216 is subsequently performed.

In Step 214, the warning speaker 54 is operated, and a process of supplying the steering ECU 62 with a command for causing the steering ECU62 to steer the vehicle 22 is performed. After the process in Step 214 is performed, the warning sound for informing the existence of the other vehicle or the infrastructure is issued to the driver from the warning speaker 54, which exists in the vehicle compartment on a side where the subject pattern region interferes with the other patterns. In addition, the steering ECU generates the steering reaction force so that the reaction force against the steering performed by the driver is generated in the vehicle 22, according to the command from the beam ECU 32. When the process in Step 214 terminates, the routine at this time terminates.

In Step 216, it is determined whether the front end side of the subject pattern region interferes with the lateral face side of the other pattern region at an angle larger than the predetermined angle θ. If an affirmative determination is made, it can be determined that the other vehicle radiating the other patterns runs ahead of the subject vehicle 22, and the subject vehicle 22 is entering later than the other vehicle does. In this case, it is suitable to call attention of the driver and perform the brake control in the subject vehicle 22 in order to avoid contact with the other vehicle. Thus, if the affirmative determination is made, a process in Step 218 is subsequently performed. On the other hand, if a negative determination is made, a process in Step 220 is subsequently performed.

In Step 218, the warning speaker 54 is operated, and a process of supplying the brake ECU 60 with a command for causing the brake ECU 60 to apply the brake to the vehicle 22 is performed. After the process in Step 218 is performed, the warning speaker 54 issues the warning sound for informing the existence of the other vehicle or the infrastructure. In addition, the brake ECU generates the braking force for the vehicle 22 according to the command from the beam ECU. When the process in Step 218 terminates, the routine at this time terminates.

In Step 220, it is determined whether the front end side of the subject pattern region interferes with the front end side or the rear end side of the other pattern region. If an affirmative determination is made, it can be determined that the front portion of the other vehicle radiating the other patterns is approaching the subject vehicle 22, or the front portion of the subject vehicle 22 is approaching the rear portion of the other vehicle. In this case, it is suitable to call the driver's attention and to perform the brake control in the subject vehicle 22 in order to avoid contact with the other vehicle. Thus, if the affirmative determination is made, a process in Step 222 is subsequently performed. On the other hand, if a negative determination is made, the routine at this time terminates.

In Step 222, the warning speaker 54 is operated, and a process of supplying the brake ECU 60 with a command for causing the brake ECU 60 to apply the brake to the vehicle 22 is performed. After the process in Step 222 is performed, the warning speaker 54 issues the warning sound for informing the existence of the other vehicle or the infrastructure. In addition, the brake ECU 60 generates the braking force for the vehicle 22 according to the command from the beam ECU 32. When the process in Step 222 terminates, the routine at this time terminates.

According to the aforementioned routine shown in FIG. 14, it is possible to determine a state where attention is required in the subject vehicle 22 during running based on the positional relation between the subject patterns and the other patterns in the images from the imaging devices 44. In addition, it is possible to call the driver's attention to the danger in a manner corresponding to the determination result, and to perform the running control in order to apply the brake to or steer the vehicle 22 when the possibility of the vehicle 22 colliding with the other vehicle or the like is high.

The positions of the visible light patterns formed by the vehicle 22 are changed according to the presumed running trajectory of the vehicle 22, and the lengths in the vehicle moving direction thereof are also changed. Therefore, when the images from the imaging devices 44 include the visible light patterns formed by the other vehicle, they include the moving direction and the position of the subject vehicle, and the moving direction and the position of the other vehicle. Accordingly, it is possible to make detailed determination of a state where attention is required in the subject vehicle 22 during running by determining the positional relation between the subject patterns and the other patterns in the images from the imaging devices 44. Thus, according to the movable body safety system 20, it is possible to make detailed determination of the degree of danger posed to the subject vehicle 22 during running, using the attention required state determining device 40.

Also, both the subject patterns and the other patterns are obtained by processing the images generated by the imaging devices 44. Thus, in the embodiment of the invention, since the positions of the subject patterns and the other patterns are compared on the same dimension, the degree of danger posed to the subject vehicle 22 during running can be determined with high accuracy.

Also, in the embodiment of the invention, when the degree of danger posed to the subject vehicle 22 during running is determined, the driver's attention is called in a manner corresponding to the determination result, and the running control is performed. More specifically, when the front face of the subject patterns interferes with the other patterns, it is determined that the subject vehicle 22 may contact the other vehicle or the like, and accordingly the brake control is performed. Under a condition where the subject vehicle 22 is steered for changing lanes, when the lateral face of the subject patterns interferes with the other patterns, it is determined that the subject vehicle 22 changes lanes so as to be ahead of the other vehicle, and accordingly the steering control for giving the steering reaction force is performed. Thus, according to the movable body safety system according to the embodiment of the invention, it is possible to call the driver's attention to the danger in a manner corresponding to the degree of the danger posed to the subject vehicle 22 during running, using the warning speaker 54, and to perform the running control of the vehicle without requiring the operation of the driver.

Further, in the embodiment of the invention, the imaging devices 44 of the vehicle 22 can generate the images of the invisible light patterns formed by the invisible light beams radiated by the infrastructure facility. Therefore, it is also possible to determine the positional relation between the subject patterns and the invisible light patterns as the other patterns. When the subject patterns interfere with the invisible light patterns, first, the front end portions thereof interfere with the invisible light patterns. When the front face of the subject patterns interferes with the invisible light patterns, it is suitable to apply the brake to the vehicle 22. When the lateral face of the subject patterns interferes with the invisible light patterns, it is suitable to steer the vehicle 22 so that the vehicle 22 turns in order to prevent this situation.

As mentioned above, in the embodiment of the invention, when the front face of the subject patterns interferes with the other patterns, the brake control is performed. When the lateral face of the subject patterns interferes with the other patterns, the steering control is performed. Thus, according to the embodiment of the invention, when the images from the imaging devices 44 include the invisible light patterns formed by the infrastructure, it is possible to call the driver's attention to the danger in a manner corresponding to the degree of the danger, using the warning speaker 54, and to perform the running control of the vehicle without requiring the operation of the driver.

Thus, according to the movable body safety system 20 according to the embodiment of the invention, it is possible to make detailed determination of a state where attention is required in the vehicle 22 during running based on the positional relation between the subject patterns and the other patterns in the images from the imaging devices 44. In addition, it is possible to perform the running control of the vehicle 22 and to call the driver's attention, using the determination result. Accordingly, it is possible to improve the safety in vehicle running.

Note that, in the embodiment of the invention, the frequency band of the invisible light beam radiated by the infrastructure facility and the frequency band of the visible light beam radiated by the vehicle 22 are mutually different. Therefore, when the subject pattern formed by the subject vehicle 22 and the other pattern formed by the other vehicle or the like are mixed in the generated images, it is possible to determine whether the other patterns are formed by the infrastructure or the other vehicle. Accordingly, detailed switching of the vehicle control (more particularly, each control of the brake, the steering, the display 52, and the warning speaker 54) may be performed depending on the type of the other pattern. Also, the frequency band of the invisible light beam radiated by the infrastructure facility may be changed according to the degree of danger in vehicle running. In this case, it is possible to distinguish a traffic sign such as a pedestrian crossing which vehicles normally pass, and a shoulder of the road which vehicles are prohibited from entering. Therefore, detailed switching of the vehicle control can be performed.

Note that, in the aforementioned embodiment, the vehicle 22 corresponds to "a movable body" which will be described in claims, the visible light pattern and the invisible light pattern correspond to "road surface projection information" which will be described in claims, and the beam radiator 24 corresponds to "a beam radiating portion" which will be described in claims.

Also, in the aforementioned embodiment, the beam ECU 32 extracts the visible light patterns and the invisible light patterns based on the images from the imaging devices 44, whereby "a road surface projection information obtaining portion", which will be described in claims, is realized. In addition, the beam ECU 32 extracts the visible light patterns based on the images from the imaging devices 44, whereby "a course information detecting portion", which will be described in claims, is realized. Further, the beam ECU 32 performs the processes in Step 206, Step 208, Step 212, and Step 216 in the routine shown in FIG. 14, whereby "an attention required state determining portion", which will be described in claims, is realized.

Meanwhile, in the aforementioned embodiment of the invention, the pattern, which is formed by the visible light beam radiated by the beam radiator 24 and is reflected on the road surface, is formed in a line shape. However, the invention is not limited to this, and the pattern may be formed in a lattice form, an enclosed form, or the like.

Also, in the aforementioned embodiment, the patterns, which are formed by the visible light beams radiated by the beam radiators 24 and are reflected on the road surface, are the vehicle body circumscribing lines on the running trajectory on which the vehicle 22 is presumed to run based on the motion state of the vehicle 22. However, the invention is not limited to this, and the patterns may be limit lines of a region where the vehicle 22 can appropriately turn to the right and left at the time of reflecting the patterns. In this configuration, the patterns according to the turning limit lines are indicated on the road surface by the visible light beams. Therefore, it is possible to inform others of the existence of the vehicle 22 and a region where the vehicle may run. In addition, it is possible to allow the driver of the subject vehicle 22 to recognize the region, which improve the safety in vehicle running.

Also, in the aforementioned embodiment, the positions of the visible light patterns reflected on the road surface by the visible light beams radiated by the beam radiators 24 are changed according to the vehicle motion state. However, the positions of the visible light patterns may be changed in accordance with a turn signal switch operated by the driver when turning to the right or turning to the left. Alternatively, the positions of the visible light patterns may be changed according to a course which is previously determined based on course information of a navigation system.

Also, in the aforementioned embodiment, the beam radiated from the vehicle 22 has a wavelength in the visible light region. However, the invention is not limited to this, and the beam may have a wavelength in the infrared light region.

Also, in the aforementioned embodiment, both the subject patterns formed by the visible light beams from the subject vehicle 22, and the other patterns formed by the visible light or invisible light beams from the other vehicle or the infrastructure are extracted by processing the images from the imaging devices 44. On the basis of the positional relation between the extracted subject patterns and the other patterns, a state where attention is required in the subject vehicle 22 during running is determined. However, the invention is not limited to this. On the presumption that the images of the subject patterns formed by the visible light beams from the subject vehicle 22 are generated by the imaging devices 44, the presumed positions and the lengths of the subject patterns may be calculated, that is, the subject patterns may be obtained without processing the images from the imaging devices 44, and by comparing the calculated results and the other patterns obtained by processing the images from the imaging devices 44, a state where attention is required in the subject vehicle 22 during running may be determined.

Further, at this time, the configuration may be such that the subject vehicle 22 does not have the beam radiators 24 for radiating the visible light beams, the other patterns from the other vehicle or the like are obtained using the imaging devices 44, and a state where attention is required in the subject vehicle 22 is determined by comparing the obtained other patterns and the patterns determined based on the presumed running trajectory of the subject vehicle 22 or the like.

What is claimed is:

1. A safety system for a first moving object comprising:
   at least one information-capturing device that obtains an infrared light which a light source of a second object, being different from the first moving object, emits onto the road surface to inform other moving objects of existence of the second object; and
   an attention required state determining device that
   (1) extracts course information on the first moving object that is one of: first course information on the first moving object that is predetermined and second course information comprising light obtained by the at least one information-capturing device which a light source on the first moving object emits onto the road surface,
   (2) extracts positional information on the second object from the infrared light emitted onto the road surface from the second object, and
   (3) determines a likelihood of collision between the first moving object and the second object based on a positional relationship between the course information on the first moving object and the positional information on the second object.

2. The safety system of claim 1, wherein the course information represents an estimated traveling path of the first moving object.

3. The safety system of claim 2, wherein the estimated traveling path is estimated based on a kinetic parameter of the first moving object.

4. The safety system of claim 3, wherein the estimated traveling path represents an estimated circumscribing line of the first moving object over time.

5. The safety system of claim 2, wherein the estimated traveling path represents a first estimated circumscribing line of the first moving object over time.

6. The safety system of claim 1, wherein the second object is a second moving object.

7. The safety system of claim 6, wherein the infrared light emitted by the second moving object represents an estimated traveling path of the second object.

8. The safety system of claim 7, wherein the estimated traveling path of the second object is estimated based on a kinetic parameter of the second object.

9. The safety system of claim 8, wherein the estimated traveling path of the second object represents an estimated circumscribing line of the second object over time.

10. The safety system of claim 7, wherein the estimated traveling path of the second object represents an estimated circumscribing line of the second object over time.

11. The safety system of claim 8, wherein the course information represents an estimated path of the first moving object that is estimated based on a kinetic parameter of the first moving object.

12. The safety system of claim 1, wherein:
    the information-capturing device obtains stationary object road surface projection information formed on the road surface by an infrared light of a stationary object;
    the attention required state determining device determines the likelihood of collision based on the relationship between the course information and the stationary object road surface projection information.

13. The safety system of claim 1, wherein
    the information-capturing device obtains at least one of the infrared light which the light source of the second object emits and the light which the light source of the first moving object emits.

14. The safety system of claim 1, further comprising:
    a course information detecting portion that detects the course information on the first moving object based on a motion parameter of the first moving object.

* * * * *